US012646943B2

(12) United States Patent
Elkhomri

(10) Patent No.: US 12,646,943 B2
(45) Date of Patent: Jun. 2, 2026

(54) ML-OPTIMIZED VPP CONTROLLER FOR BATTERY POWERED EV CHARGING NETWORKS

(71) Applicant: Banpu Innovation & Ventures LLC, Wilmington, DE (US)

(72) Inventor: Othman Elkhomri, Wilmington, DE (US)

(73) Assignee: Banpu Innovation & Ventures LLC, Wilmington, DE (US)

( * ) Notice: Subject to any disclaimer, the term of this patent is extended or adjusted under 35 U.S.C. 154(b) by 459 days.

(21) Appl. No.: 18/240,862

(22) Filed: Aug. 31, 2023

(65) Prior Publication Data

US 2025/0079836 A1     Mar. 6, 2025

(51) Int. Cl.
| | |
|---|---|
| *B60L 53/63* | (2019.01) |
| *H02J 3/00* | (2006.01) |
| *H02J 3/32* | (2006.01) |
| *H02J 3/38* | (2006.01) |
| *H02J 101/24* | (2026.01) |
| *H02J 103/30* | (2026.01) |
| *H02J 103/35* | (2026.01) |

(52) U.S. Cl.
CPC .............. *H02J 3/004* (2020.01); *B60L 53/63* (2019.02); *H02J 3/32* (2013.01); *H02J 3/381* (2013.01); *H02J 2101/25* (2026.01); *H02J 2103/30* (2026.01); *H02J 2103/35* (2026.01)

(58) Field of Classification Search
CPC .... H02J 3/004; H02J 3/32; H02J 3/381; H02J 2103/35; H02J 2101/25; H02J 2103/30; B60L 53/63
See application file for complete search history.

(56) References Cited

U.S. PATENT DOCUMENTS

| | | | |
|---|---|---|---|
| 10,197,632 B2 * | 2/2019 | Wenzel | .................. G06Q 50/06 |
| 2008/0262820 A1 * | 10/2008 | Nasle | .................. G05B 13/048 |
| | | | 705/412 |

(Continued)

FOREIGN PATENT DOCUMENTS

| | | | | |
|---|---|---|---|---|
| CN | 111784055 A | * | 10/2020 | ......... G06Q 30/0206 |

*Primary Examiner* — Scott T Baderman
*Assistant Examiner* — Mario M Velez-Lopez
(74) *Attorney, Agent, or Firm* — Osha Bergman Watanabe & Burton LLP

(57) ABSTRACT

A method of operating a virtual power plant (VPP) controller, that manages an electric vehicle (EV) charging station connected to a power grid, a battery storage system, and an independent power plant, includes: obtaining a first data set including time-series information of power output from the independent power plant; training a machine learning (ML) model that predicts power output from the independent power plant over a predetermined prediction horizon; obtaining a second data set including time-series information of: power demand information from the EV charging station; and power availability information from each of the battery storage system, the power grid, and the independent power plant; generating a predicted schedule of power output from the independent power plant over the predetermined prediction horizon; generating a command by inputting the second data set and the predicted schedule into an energy management system (EMS) policy.

18 Claims, 8 Drawing Sheets

(56) References Cited

U.S. PATENT DOCUMENTS

| | | | |
|---|---|---|---|
| 2013/0079943 A1* | 3/2013 | Darden, II | G06F 1/30 |
| | | | 700/297 |
| 2018/0138742 A1* | 5/2018 | Song | H02J 3/14 |
| 2019/0131923 A1* | 5/2019 | Hooshmand | H02J 3/003 |
| 2021/0213933 A1* | 7/2021 | Borrelli | B60K 6/485 |
| 2022/0029424 A1* | 1/2022 | Burra | H02J 3/48 |
| 2022/0067850 A1* | 3/2022 | Bhasme | G05B 13/0265 |
| 2024/0332967 A1* | 10/2024 | Walkingshaw | G01W 1/10 |
| 2024/0343149 A1* | 10/2024 | Galbraith | B60L 53/62 |
| 2025/0167550 A1* | 5/2025 | Chen | H04L 9/50 |

* cited by examiner

Information/Command Exchange

Two-way Power Exchange

One-way Power Exchange

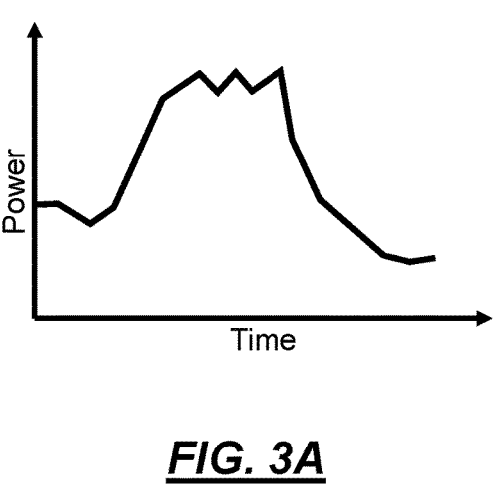
_FIG. 3A_
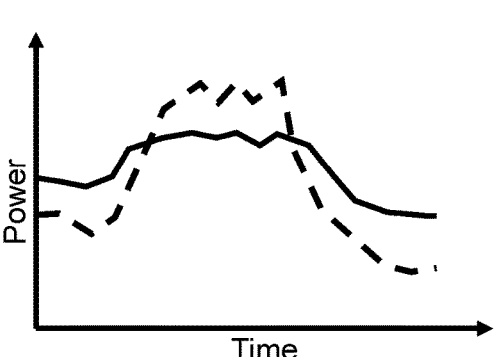
_FIG. 3B_
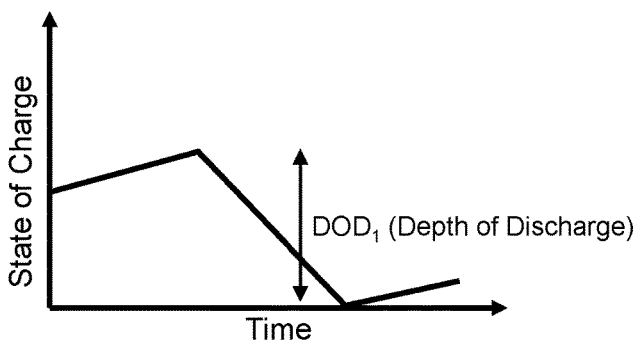
_FIG. 3C_
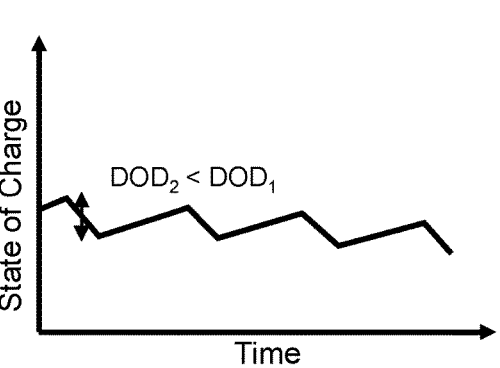
_FIG. 3D_

| Parameter | Value |
|---|---|
| Q=P | $\text{diag}(10^3, 0, 10^5, 10^5, 10^5, 10^5, 2\times10^4, 2\times10^4, 2\times10^4, 10^3)$ |
| R | $\text{diag}(10^2, 10^2, 10^2, 10, 10, 10)$ |
| $N_u$ | 20 |
| $N_p$ | 20 |
| $T_s$ | 15 minutes |

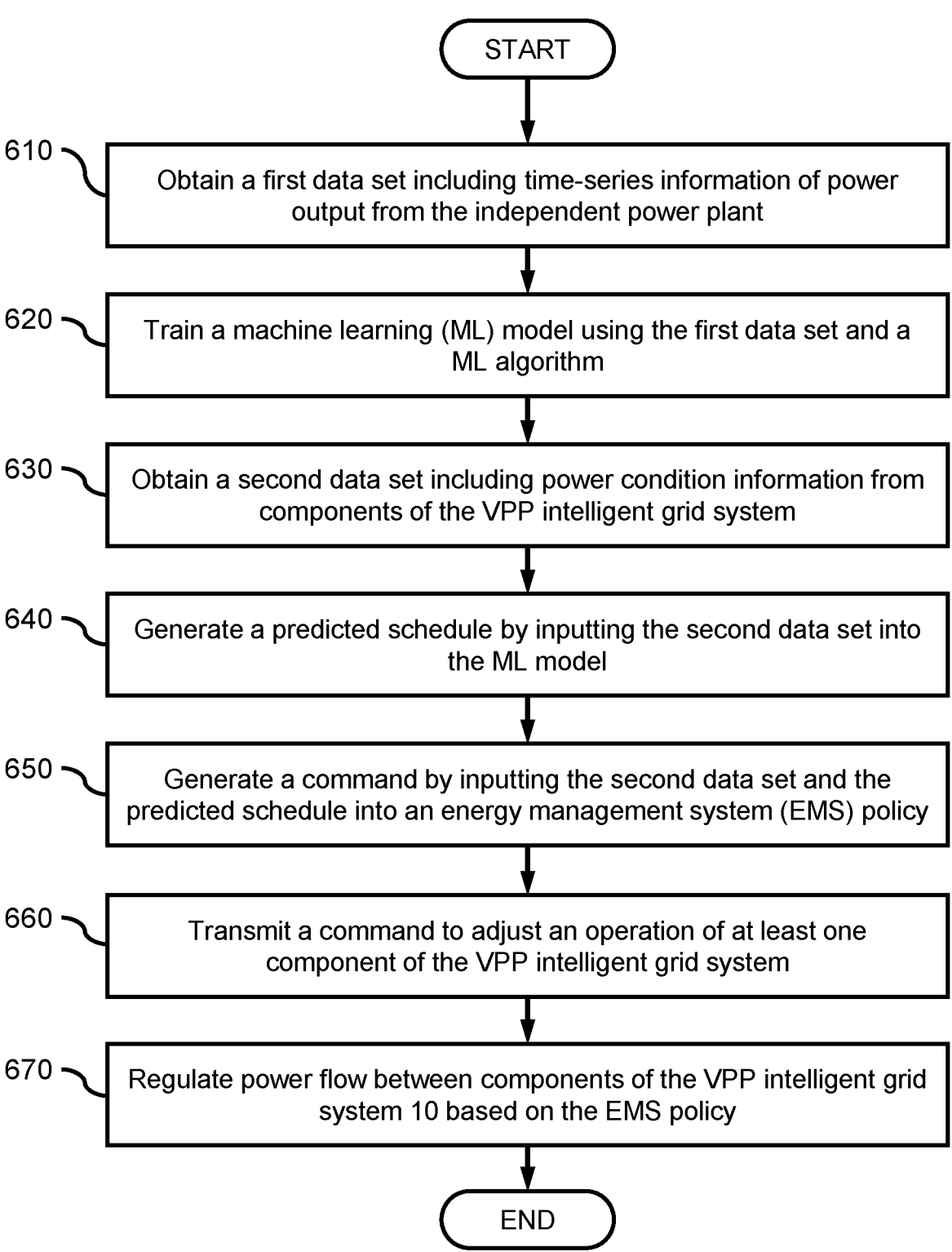

START

610 — Obtain a first data set including time-series information of power output from the independent power plant 620 — Train a machine learning (ML) model using the first data set and a ML algorithm 630 — Obtain a second data set including power condition information from components of the VPP intelligent grid system 640 — Generate a predicted schedule by inputting the second data set into the ML model 650 — Generate a command by inputting the second data set and the predicted schedule into an energy management system (EMS) policy 660 — Transmit a command to adjust an operation of at least one component of the VPP intelligent grid system 670 — Regulate power flow between components of the VPP intelligent grid system 10 based on the EMS policy

END

*FIG. 6*

ML-OPTIMIZED VPP CONTROLLER FOR BATTERY POWERED EV CHARGING NETWORKS

BACKGROUND

An intelligent energy system is defined as an approach in which intelligent electricity, thermal, and gas grids are combined with power storage technologies and coordinated to identify synergies between them in order to achieve an optimal solution for each individual sector as well as for the overall energy system. In aggregated systems, different power sources and power consumption units could potentially offer flexibility to the power system. However, in aggregated systems, power production from each power source may not be directly controlled. For example, the power generated by solar power plants (i.e., one or more arrays of solar panels) and wind power plants is dependent on weather conditions, time of day, and/or time of year. To maximize utilization of these variable independent power sources and minimize the risk of failing to satisfy the power demand of a power consumer at any given time, techniques for efficiently managing the power storage technologies are required.

A virtual power plant is a system that connects different components of an intelligent grid ecosystem (power sources, power storage technologies (e.g., battery systems, electric vehicle batteries), and power consumers (e.g., buildings, electric vehicles, intelligent systems)) and coordinates optimal control solutions for the overall power ecosystem. In other words, the aim of the virtual power plant control system is to manage the power flow through the grid components in order to increase the economic performance and sustainability of the grid.

SUMMARY

In general, embodiments of the invention relate to a method of operating a virtual power plant (VPP) controller that manages an electric vehicle (EV) charging station that is connected to a power grid, a battery storage system, and an independent power plant. The method includes: obtaining a first data set including time-series information of power output from the independent power plant; training, using the first data set and a machine learning (ML) algorithm, a ML model that predicts power output from the independent power plant over a predetermined prediction horizon; obtaining a second data set including time-series information of: power demand information from the EV charging station; and power availability information from each of the battery storage system, the power grid, and the independent power plant; generating, by inputting the second data set into the ML model, a predicted schedule of power output from the independent power plant over the predetermined prediction horizon; generating, by inputting the second data set and the predicted schedule into an energy management system (EMS) policy, a command that controls: power imported from at least one of the power grid, the battery storage system, the EV charging station, and the independent power plant; and power exported to at least one of the power grid, the battery storage system, and the EV charging station; and transmitting the command to adjust an operation of at least one of the power grid, the battery storage system, the EV charging station, and the independent power plant.

In addition, embodiments of the invention relate to a non-transitory computer readable medium storing instructions executable by a computer processor of a VPP controller at manages an EV charging station that is connected to a power grid, a battery storage system, and an independent power plant. The instructions comprise functionality for: obtaining a first data set including time-series information of power output from the independent power plant; training, using the first data set and a machine learning (ML) algorithm, a ML model that predicts power output from the independent power plant over a predetermined prediction horizon; a second data set including time-series information of: power demand information from the EV charging station; and power availability information from each of the battery storage system, the power grid, and the independent power plant; generating, by inputting the second data set into the ML model, a predicted schedule of power output from the independent power plant over the predetermined prediction horizon; generating, by inputting the second data set and the predicted schedule into an energy management system (EMS) policy, a command that controls: power imported from at least one of the power grid, the battery storage system, the EV charging station, and the independent power plant; and power exported to at least one of the power grid, the battery storage system, and the EV charging station; and transmitting the command to adjust an operation of at least one of the power grid, the battery storage system, the EV charging station, and the independent power plant.

In addition, embodiments of the invention relate to a VPP controller at manages an EV charging station that is connected to a power grid, a battery storage system, and an independent power plant. The VPP controller includes: a processor configured as a power grid interface that communicates with the power grid, a battery storage interface that communicates with the battery storage system, an EV interface that communicates with the EV charging station, and a power plant interface that communicates with the independent power plant; and a memory storing instructions that, when executed, cause the processor to: obtain a first data set including time-series information of power output from the independent power plant; train, using the first data set and a machine learning (ML) algorithm, a ML model that predicts power output from the independent power plant over a predetermined prediction horizon; obtain a second data set including time-series information of: power demand information from the EV charging station; and power availability information from each of the battery storage system, the power grid, and the independent power plant; generate, by inputting the second data set into the ML model, a predicted schedule of power output from the independent power plant over the predetermined prediction horizon; generate, by inputting the second data set and the predicted schedule into an energy management system (EMS) policy, a command that controls: power imported from at least one of the power grid, the battery storage system, the EV charging station, and the independent power plant; and power exported to at least one of the power grid, the battery storage system, and the EV charging station; and transmit the command to adjust an operation of at least one of the power grid, the battery storage system, the EV charging station, and the independent power plant.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3A-3D show examples of improving power management in an intelligent grid system in accordance with one or more embodiments.

FIG. 6 shows a flowchart in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Figure 1A:
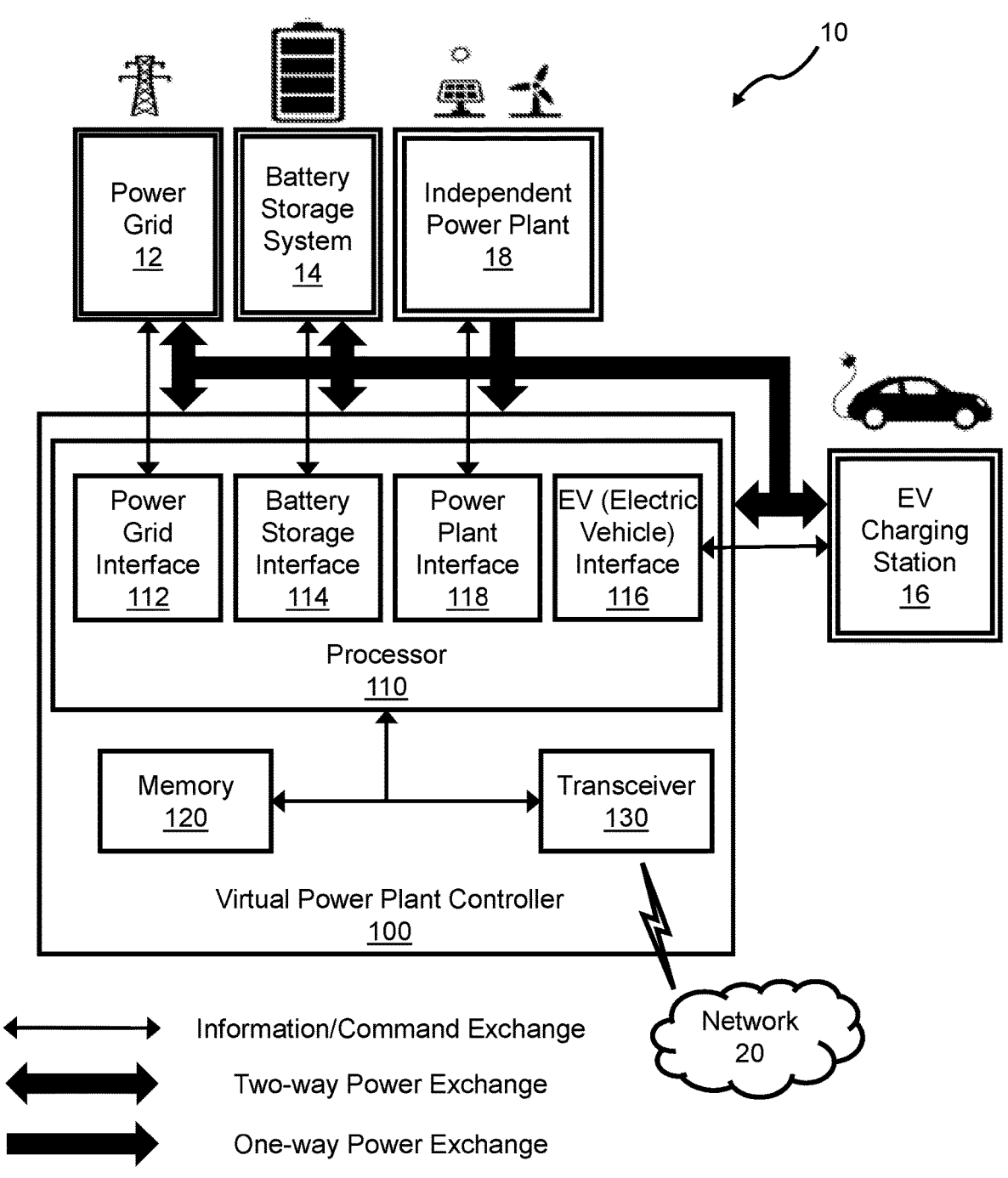
FIGS. 1A-1B shows examples of a VPP intelligent grid system in accordance with one or more embodiments.
Figure 1B:
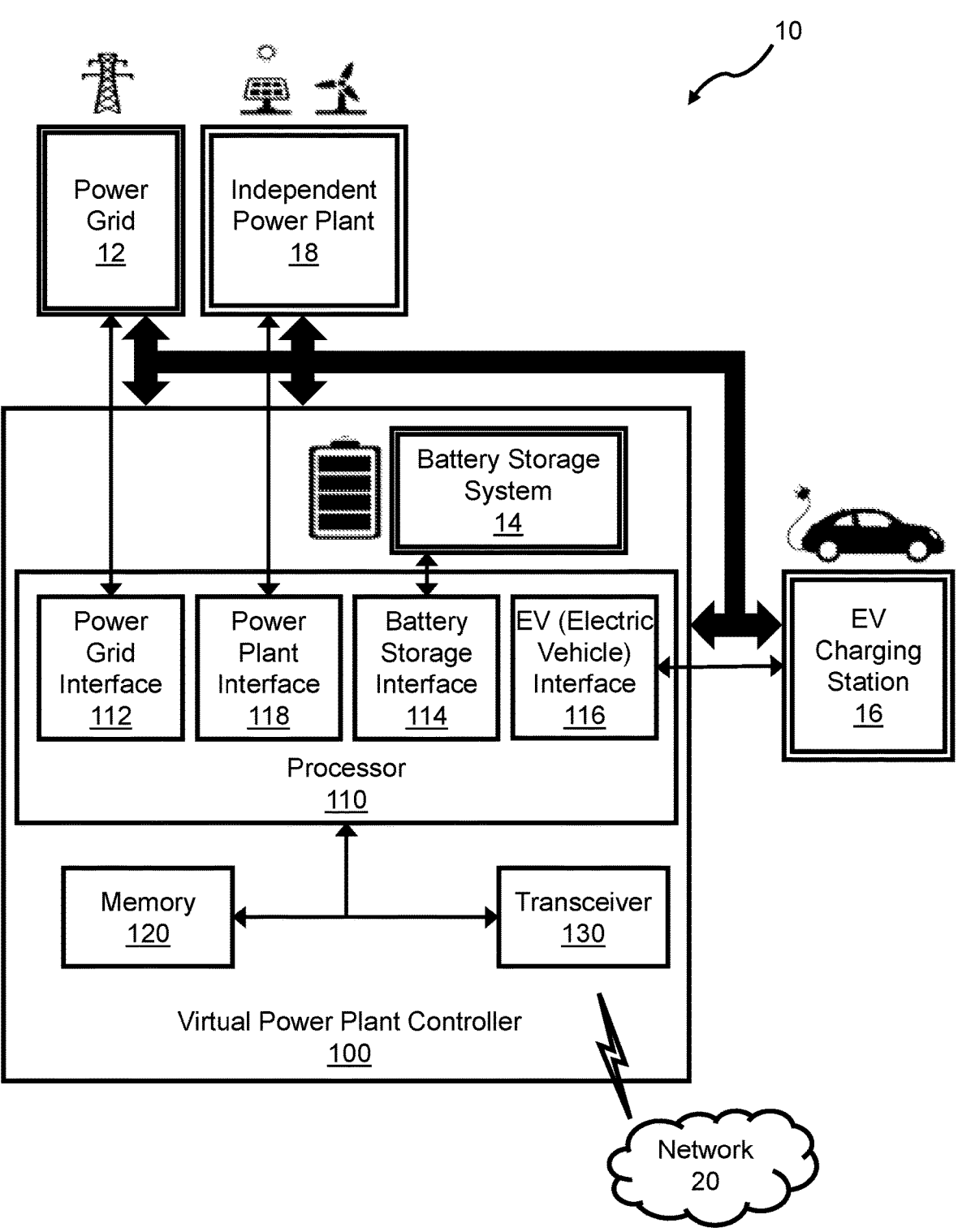

FIGS. 1A-1B show examples of a VPP intelligent grid system 10 in accordance with one or more embodiments.

As shown in FIG. 1A, in one or more embodiments, a VPP intelligent grid system 10 includes a power grid 12, a battery storage system 14, an electric vehicle (EV) charging station 16, an independent power plant 18, a network 20, and the VPP controller 100. The VPP controller 100 connects together and manages power distribution between power sources and power consumers in the VPP intelligent grid system 10. The power grid 12 (e.g., an alternating current (AC) power network) is a unique subsystem in that it can deliver any required amount of power to the VPP intelligent grid system 10. However, the VPP controller 100 may seek to minimize an economic cost of the power grid 12 (e.g., reduce usage and dependence on the power drawn from power grid 12) by optimally managing any independent power sources and energy storage systems.

To guarantee capacity and reliability requirements for any power consuming subsystems connected to the VPP intelligent grid system 10, the VPP intelligent grid system 10 may include a battery storage system 14 that stores and provides power on demand in an optimal manner. Furthermore, an independent power plant 18 (e.g., a solar power plant providing power from a solar radiation source) may deliver power to the VPP intelligent grid system 10 to further reduce the amount of power utilized from the power grid 12. Furthermore, certain end-user subsystems equipped with batteries (e.g., EVs and home battery systems) may be utilized by the VPP intelligent grid system 10 to store or release power.

Each of the components of the VPP intelligent grid system 10 is described in further detail below.

The VPP controller 100 has multiple components, and may include, for example, a processor 110, a memory 120, and a transceiver 130. The processor 110 may be an integrated circuit (e.g., one or more cores, or micro-cores) for processing instructions and data sets, training a machine learning (ML) model, determining power condition information, and generating control commands, as described in further detail below. The memory 120 may be random access memory (RAM), cache memory, flash memory, or a storage drive that stores information for the VPP controller 100. The transceiver 130 may be a wired or wireless communications circuit (e.g., data port, antenna(s) array, communications bus) that allows the VPP controller 100 to communicate with an external device, such as a user device, a subsystem 12, 14, 16, 18 or a network 20; each of which may provide supplemental information to guide or control the VPP controller 100 from outside of the feedback loops in the VPP intelligent grid 10. Although the VPP controller 100 in FIG. 1A is shown as having three components (110, 120, and 130), in other embodiments of the invention, the VPP controller 100 may have more components (e.g., integrated memory, clock, analog to digital converter, communication bus) or fewer components. Furthermore, the functionality of each component described above may be shared among multiple components or performed by a different component. For example, each component (110, 120, and 130) may be utilized multiple times in serial or parallel to carry out repeated, iterative, or parallel operations.

The VPP controller 100 may also include one or more input device(s) (not shown), such as a button, touchscreen, camera, microphone, or any other type of input device for the user to provide information directly to the VPP controller 100 rather than through the transceiver 130. Further, the VPP controller 100 may include one or more output device(s) (not shown), such as a screen (e.g., a liquid crystal display (LCD), light emitting diode (LED) display, organic light emitting diode (OLED) display, or any other display device to provide information directly to the user rather than through the transceiver 130. One or more of the output device(s) may be the same or different from the input device(s). The VPP controller 100 may connect to a network 20 (e.g., a local area network (LAN), a wide area network (WAN) such as the Internet, mobile network, or any other type of network) via the transceiver 130 to exchange information between the VPP controller 100 and any device external to the VPP intelligent grid 10.

Further, one or more processing elements of the VPP controller 100 may be located at a remote location and may be connected to the other elements over the network 20. For example, one or more embodiments of the invention may be implemented by spreading the information processing across a distributed system having a plurality of nodes that include distinct computing and storage devices (i.e., cloud computing). Each node may correspond to a computer processor with associated physical memory. Each node may alternatively correspond to a computer processor or micro-core of a computer processor with shared memory and/or resources.

Software instructions executed by the VPP controller 100 may be in the form of computer readable program code to perform embodiments of the invention and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

The processor 110 of the VPP controller 100 is connected with subsystems of the VPP intelligent grid components (i.e., local controllers/processors) to aid in controlling each intelligent grid component. In one or more embodiments, the processor 110 defines set-points that control power flow between each VPP intelligent grid component. In one or more embodiments, processor 110 of the VPP controller 100 is the centralized policy manager for the different VPP intelligent grid component. The processor 110 has multiple functional components, and may include, for example, a power grid interface 112, a battery storage interface 114, an EV interface 116, and a power plant interface 118.

The power grid interface 112 communicates with the power grid 12 to exchange power grid information (e.g., a reference power level, connection type/status information, price information) and consequent control commands (e.g., power requests, shut-down/disconnect requests). Furthermore, the power grid interface 112 contributes to the training of a ML model by modelling the power grid 12 according to the power grid specifications and operating conditions.

The battery storage interface 114 communicates with the battery storage system 14 to exchange battery condition information (e.g., state of charge information, connection type/status information, battery charge cycle number) and consequent control commands (e.g., power requests, shut-down/disconnect requests). Furthermore, the battery storage interface 114 contributes to the training of a ML model by modelling the battery storage system 14 according to the battery specifications and operating conditions.

The EV interface 116 communicates with the EV charging station 16 to exchange information (e.g., power demand levels, connection type/status information, charging rate information) and consequent control commands (e.g., power requests, shut-down/disconnect requests). Furthermore, the EV interface 116 contributes to the training of a ML model by modelling the EV charging station 16 according to its specifications and operating conditions (e.g., usage statistics, min/max power transfer rates, charging rate of a fast charging or a slow electric vehicle charging station).

The power plant interface 118 communicates with the independent power plant 18 to exchange information (e.g., solar power conversion efficiency parameters, solar panel health information, connection type/status information, weather information) and consequent control commands (e.g., power requests, shut-down/disconnect requests). Furthermore, the power plant interface 118 contributes to the training of a ML model by modelling the independent power plant 18 according to its specifications and operating conditions.

Although the VPP intelligent grid system 10 in FIG. 1A is shown as having 6 components (12, 14, 16, 18, 20 and 100), in other embodiments of the invention, a VPP intelligent grid system 10 may have more, fewer, or different components. In particular, while the above embodiments have been described with respect to a solar power plant, the present invention is not limited to this configuration and the independent power plant 18 may be any type of suitable power generation facility (e.g., wind power plant, hydro-power plant, geothermal power plant).

The functionality of each component of the VPP intelligent grid system 10 described above may be shared among multiple instances of a single type of component (e.g., a plurality of distributed battery storage systems 14). Furthermore, the functionality of each component of the VPP intelligent grid system 10 described above may be shared among multiple components of different types. For example, the EV charging station 16 may act as a battery storage system 14 to supply power to the VPP intelligent grid (exporting energy from an EV at an EV charging station).

As another example, FIG. 1B shows an example VPP intelligent grid system in accordance with one or more embodiments. One or more embodiments of the VPP intelligent grid system 10 may include an integrated battery storage system 14 in the VPP controller 100. In other words, the VPP controller 100 may simultaneously function as an energy management system (EMS) and as a battery management system (BMS) for the VPP intelligent grid 10.

Figure 2A:
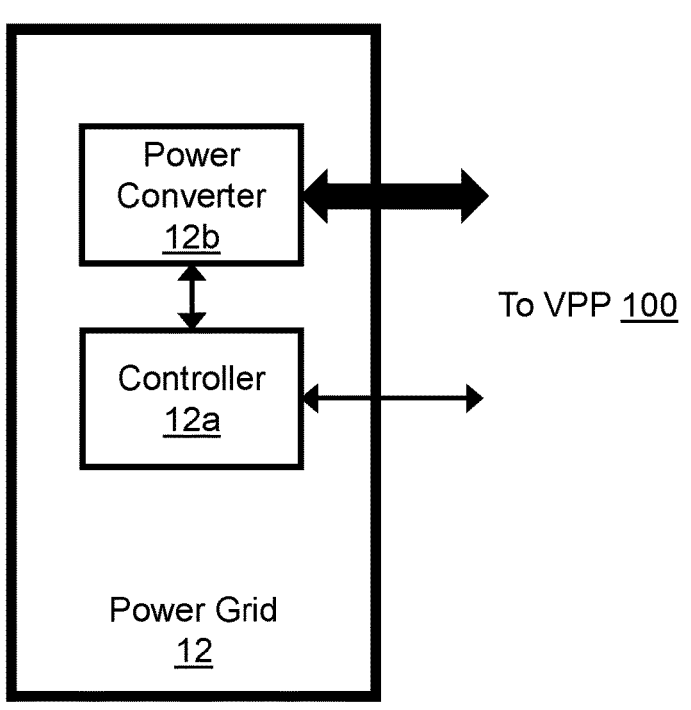
FIG. 2A shows an example power grid in accordance with one or more embodiments.

FIG. 2A shows an example power grid 12 in accordance with one or more embodiments.

The power grid 12 of the VPP intelligent grid system 10 includes the infrastructure of a power network that can import any required amount of power to the VPP intelligent grid system 10. Further, when required or financially desirable, power can be exported (i.e., sold) to the power grid 12 by the VPP controller 100.

The power grid 12 includes a controller 12a (e.g., a processor) that communicates with the VPP controller 100 to coordinate the export and import of power to and from the power grid 12. The controller 12a controls a power converter 12b that facilitates the export and import of power between the power grid 12 and the rest of the VPP intelligent grid system 10. Note, the power flow is bidirectional. Further, the communication link between the controller 12a and the power grid interface 112 of the VPP controller 100 is bidirectional to exchange power grid information (e.g., a reference power level, connection type/status information, price information) and consequent control commands.

The power converter 12b may be an AC/DC power converter capable of operating in both rectified and inverter modes in order to permit the power to flow from/to the power grid 12 and the VPP intelligent grid system 10. The power converter 12b may switch operational modes based on control information received from the VPP controller 100. For example, the power converter 12b may have a bidirectional AC/DC power converter topology. It may transfer power between a three-phase AC voltage supply and a DC voltage bus. For example, the power converter 12b may comprise six transistors (e.g., IGBT-Diode switches) connected with the three-phase AC voltage supply through inductance-resistance series filters. A DC capacitor may be connected across the DC voltage bus to keep the voltage constant. The bidirectional AC-DC converter operates in two modes. The first mode is rectifier mode, in which the bidirectional AC-DC converter operates as a front-end rectifier and allows power transfer from the three-phase AC voltage end to the DC voltage bus. The second mode is inverter mode, in which the bidirectional AC-DC converter operates as a voltage source inverter and allows power flow from DC voltage bus to the three-phase AC voltage.

The control of power converter 12b may be based on voltage-oriented control (VOC) scheme, which decomposes the active and reactive power in stationary $\alpha$-$\beta$ coordinate and synchronizes the powers with rotating d-q reference frames by characterizing the current control loops using proportional integral (PI) controllers. Moreover, a virtual-flux-oriented control could be considered which also uses the PI controllers. The major limitation of these control schemes is tuning the PI controllers which further affects the coordinate transform accuracy.

Furthermore, a direct power control (DPC) scheme may be applied for grid-tied AC-DC converter based on the direct torque control (DTC) principle, which also uses the PI controllers. In order to improve the performance of the power converter 12b, a look-up table (LUT) based direct power control (DPC) scheme may be implemented. In these policies, the switching action of the power converter 12*b* may be performed based on a predefined switching state table on the basis of active and reactive power characteristics. This look-up table-based DPC method may produce undesirable harmonic spectrums. Alternatively, different control policies may be employed (e.g., Sliding Mode, Fuzzy Logic, or Model Predictive Control).

In one or more embodiments, the power converter 12*b* may further include a DC/DC power converter for voltage stepping or converting between different voltage levels of different components in the VPP intelligent grid system 10.

Figure 2B:
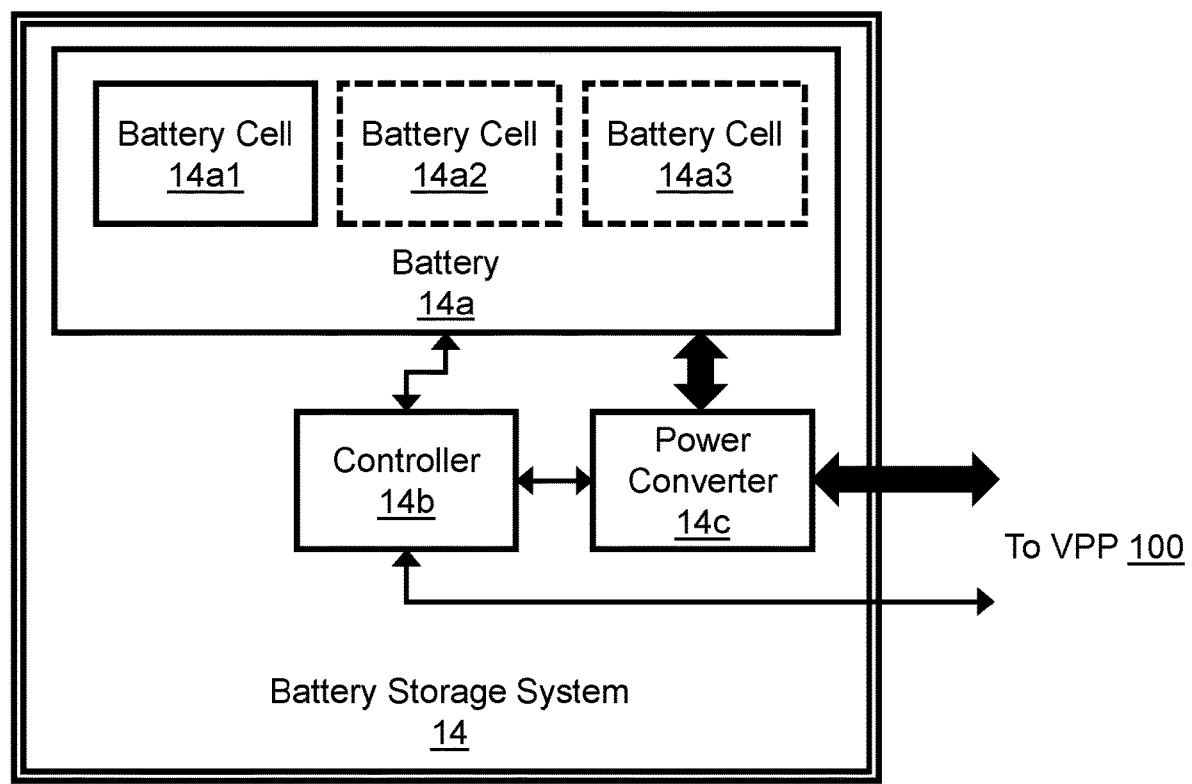
FIG. 2B shows an example battery storage system in accordance with one or more embodiments.

FIG. 2B shows an example battery storage system 14 in accordance with one or more embodiments.

The battery storage system 14 includes one or more batteries 14*a* that represent a power storage system for accumulating or releasing power from/to the VPP intelligent grid system 10. Each battery 14*a* includes one or more battery cells 14*a*1-3 operating together to provide the required storage capacity and voltage of the entire battery 14*a*. The battery 14*a* may be Lithium-based. However, embodiments of the present invention are not limited to Lithium-based batteries and any appropriate rechargeable battery technology or chemistry may be employed by the battery storage system 14.

The battery storage system 14 is scalable to any appropriate facility size with large capacity batteries playing a key role in future energy scenarios with fluctuating power supply. For example, electric vehicle batteries may be utilized as a "microscale" battery storage system 14 for a household (e.g., off-grid homes). On the other hand, the battery storage system 14 may be scaled up to massive arrays of battery banks to help power large scale commercial or manufacturing facilities. The battery storage system 14 may be charged from the power grid 12 when the price of electricity is cheaper (i.e., below a reference energy cost) to achieve load leveling and peak shaving in the power grid 12 consumption in a cost effective manner.

The battery storage system 14 includes a controller 14*b* (e.g., a processor) that regulates the power flow between battery cells 14*a*1-3 as well as charging and discharging phases according to battery specifications and operating conditions. Furthermore, the controller 14*b* communicates with the VPP controller 100 to coordinate the export and import of power to and from the battery 14*a*. The controller 14*b* controls a power converter 14*c* that facilitates the export and import of power between the battery 14*a* and the rest of the VPP intelligent grid system 10. Note, the power flow is bidirectional, due to the possibility to store and release power from/to the VPP intelligent grid system 10 according to instantaneous operating conditions. Further, the communication link between the controller 14*b* and the battery storage interface 114 of the VPP controller 100 is bidirectional to exchange battery condition information (e.g., state of charge information, connection type/status information, battery charge cycle number) and consequent control commands.

Similar to the power converter 12*b*, the power converter 14*c* may be an AC/DC power converter capable of operating in both rectified and inverter modes in order to permit power flow between the battery 14*a* and the power grid 12 of the VPP intelligent grid system 10. Furthermore, the power converter 14*c* may include a DC/DC power converter for voltage stepping or converting between different voltage levels of different components in the VPP intelligent grid system 10.

Figure 2C:
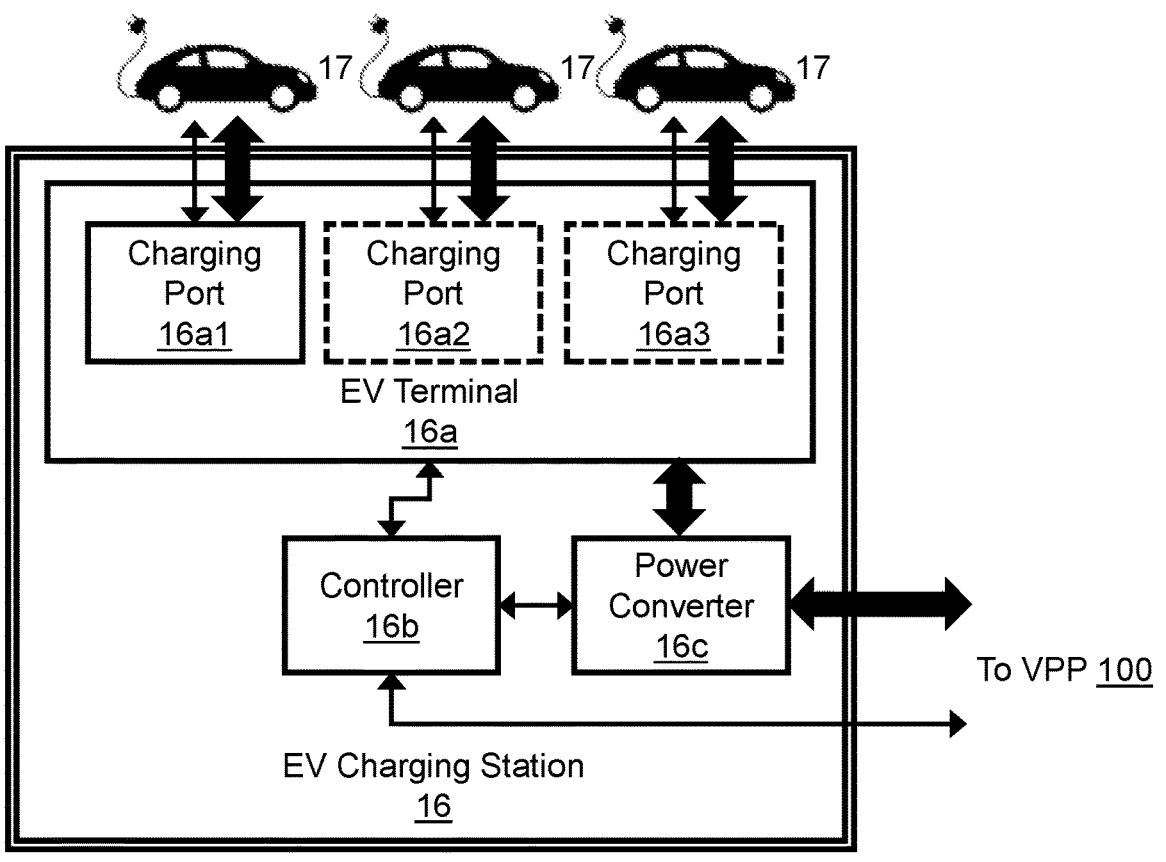
FIG. 2C shows an example EV charging station in accordance with one or more embodiments.

FIG. 2C shows an example EV charging station 16 in accordance with one or more embodiments.

In one or more embodiments, the EV charging station 16 may include one or more EV terminals 16*a* configured to connect to one or more EVs 17. Each EV terminal 16*a* may include one or more charging ports 16*a*1-3 for charging or discharging a single EV 17. While an EV 17 typically relies on the VPP intelligent grid system 10 as power provider, as discussed above, the battery within the EV 17 may also be used as a "microscale" battery storage system 14 to provide power back to the VPP intelligent grid system 10 through the EV terminal 16*a*. For example, when financially desirable (e.g., electricity prices surge during high demand periods), an EV 17 can act as a power source in the VPP intelligent grid system 10.

Because the EVs are generally expected to be grid-connected and available for long periods of the time (e.g., connected at home overnight or connected in a parking lot during business hours) with a high degree of flexibility, an EV 17 can function as a quick-response power storage unit with bi-directional power flow capabilities. This flexibility can support a set of power services to influence the timing and rate of power distribution between EV battery and the VPP intelligent grid system 10 to yield benefits for the user, system, and society. For example, these services could involve frequency regulation, synthetic inertia, adaptive charging, network balancing, overvoltage management, line overloading, charging flexibility, and management.

The EV charging station 16 includes a controller 16*b* (e.g., a processor) that communicates with the VPP controller 100 to coordinate the export and import of power to and from the EV terminal 16*a*. The controller 16*b* controls a power converter 16*c* that facilitates the export and import of power between the EV terminal 16*a* and the rest of the VPP intelligent grid system 10. Note, the power flow is bidirectional. Further, the communication link between the controller 16*b* and the EV interface 116 of the VPP controller 100 is bidirectional to exchange information (e.g., EV power levels, connection type/status information, EV charging price information) and consequent control commands. The information may further include a connection schedule (user generated or tracked by the EV terminal 16*a*) for when the EV 17 is expected to be connected to the system. Furthermore, the information may include a user-defined amount of power and/or conditions (e.g., price, minimum maintained charge, maximum depth of discharge) under which power is allowed to be extracted from the EV 17.

Similar to the power converter 12*b*, the power converter 16*c* may be an AC/DC power converter capable of operating in both rectified and inverter modes in order to permit power flow between the EV terminal 16*a* and the power grid 12 of the VPP intelligent grid system 10. Furthermore, the power converter 16*c* may include a DC/DC power converter for voltage stepping or converting between different voltage levels of different components in the VPP intelligent grid system 10. Furthermore, EV charging stations 16 may be deployed with one or more types of power converters 16*c* with different capabilities (e.g., peak power ratings) to provide further flexibility and granularity to the above references support services.

Although the above embodiments have been described with respect to the EV charging station 16, the present invention is not limited to this configuration and the EV charging station 16 may be replaced by any type of facility that consumes power (e.g., a commercial building, a residential building, a manufacturing facility) and is connected to the VPP intelligent grid system 10.

Figure 2D:
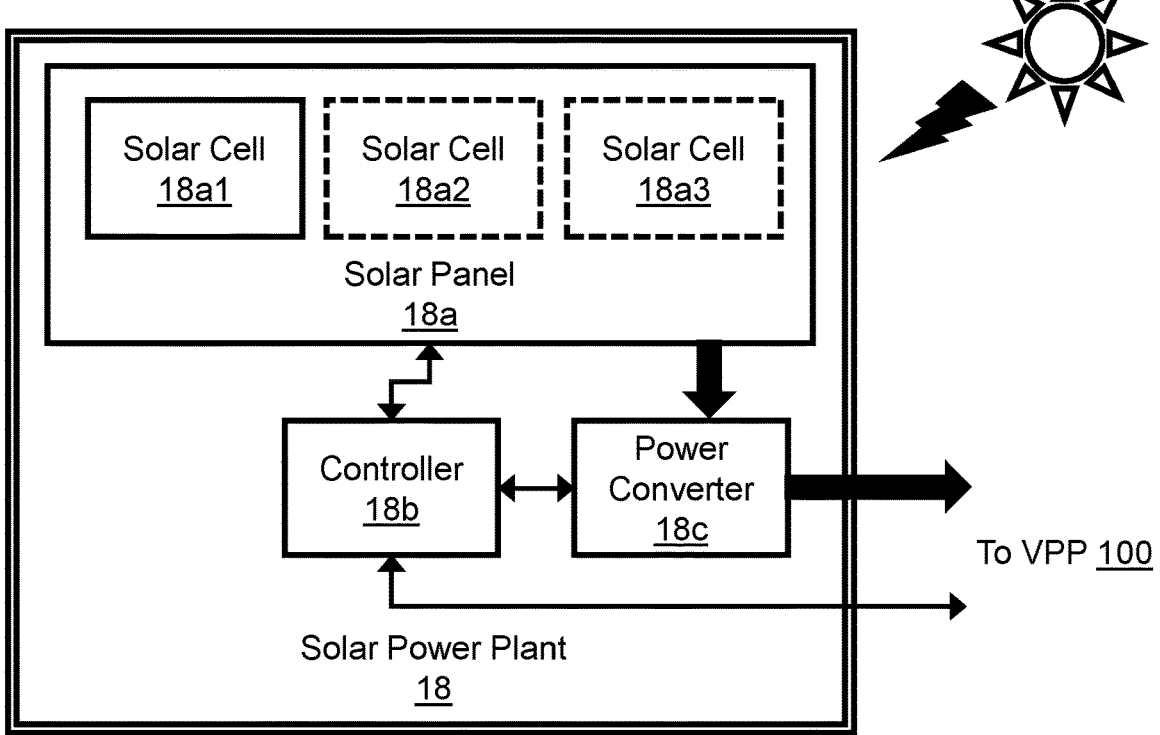
FIG. 2D shows an example of an independent power plant in accordance with one or more embodiments.

FIG. 2D shows an example independent power plant 18 in accordance with one or more embodiments.

In one or more embodiments, the independent power plant 18 is a solar power plant 18. This type of energy source is advantageous to include in a VPP intelligent grid system 10 because of the low maintenance requirements, limited infrastructure installation cost (e.g., installation on roofs without audible noise during operations), and predictable power dynamics over required control horizons. In particular applications, the solar power plant 18 could be considered to operate in conjunction with wind power systems in suitable environmental and geographical conditions.

The solar power plant 18 includes one or more solar panels 18*a* that convert solar radiation into DC power that is provided to the VPP intelligent grid system 10. Each solar panel 18*a* includes one or more solar cells 18*a*1-3 operating together in series or parallel to guarantee the specified production capacity of the entire solar panel 18*a*.

The solar power plant 18 includes a controller 18*b* (e.g., a processor) that communicates with the VPP controller 100 to coordinate the export of power from the solar panel 18*a*. The controller 18*b* controls a power converter 18*c* that facilitates the export of power from the solar panel 18*a* and the rest of the VPP intelligent grid system 10. Note, the power flow is unidirectional. The communication link between the controller 18*b* and the power plant interface 118 of the VPP controller 100 is bidirectional to exchange information (e.g., solar power conversion efficiency parameters, solar panel health information, connection type/status information, weather information) and consequent control commands.

Similar to the power converter 12*b*, the power converter 18*c* may be an AC/DC power converter capable of operating in both rectified and inverter modes in order to permit power flow between the solar panel 18*a* and the power grid 12 of the VPP intelligent grid system 10. Furthermore, the power converter 18*c* may include a DC/DC power converter for voltage stepping or converting between different voltage levels of different components in the VPP intelligent grid system 10.

In general, the power converter 18*c* stabilizes the output voltage generated from the solar panel 18*a* to a prescribed DC value that is compatible with the VPP intelligent grid system 10. The power converter 18*c* is configured and controlled by the controller 18*b* to extract the maximum amount of power from the solar panel 18*a* at any time. The maximum extractable power from the solar panel 18*a* depends not only on the strength of the solar irradiation but also on the operating point of the energy conversion system. In particular, a Maximum Power Point Tracking (MPPT) system may be used to maximize system efficiency and minimizes the return of investment on the solar plant installation. Maximum power extraction may be achieved by driving DC-DC converter duty-cycle. In the considered system, a non-isolated converted may be used, where the term isolation refers to the electric barriers separating input and output of the converter. Several non-isolated DC-DC converters can be used for solar plant applications (e.g., buck, boost, and buck-boost) characterized by different topologies, operational regions, advantages, and disadvantages.

As discussed above, although the above embodiments have been described with respect to a solar power plant, the present invention is not limited to this configuration and the independent power plant 18 may be any type of suitable power generation facility (e.g., wind power plant, hydropower plant, geothermal power plant).

FIGS. 3A-3D show examples of improvements to power management in an intelligent grid system in accordance with one or more embodiments.

In FIG. 3A, power output of the power grid 12 peaks during a given timeframe (e.g., day, week, year). Increasing production to peak levels or maximum capacity generally requires straining the infrastructure, which results in higher maintenance costs. As shown in FIG. 3B, peak shaving and load leveling may be employed by a VPP intelligent grid system 10 to maintain total utilization of the power grid 12 (e.g., total power imported from the power grid 12 within the timeframe is unchanged) but reduce strain and extend the lifetime of the production facility. To account for the lower peak production caused by peak shaving, the VPP intelligent grid system 10 leverages the capacity and flexibility of the other production facilities in the intelligent grid ecosystem. The VPP controller 100 manages and optimizes the power flow (e.g., reducing the electric energy cost by selecting the most efficient source corresponding to the period of peak shaving) such that quality of service can be maintained or increased while improving utilization of the various components of the VPP intelligent grid system 10.

The state of charge (SOC) of a battery storage system may be represented as a percentage of the total charge capacity. The depth of discharge (DOD) is a measure of the change in SOC over a given timeframe during usage of the battery storage system 14. Battery cells typically age more slowly when operated with a lower DOD (e.g., logarithmic relationship to battery life span). Similarly, charge and discharge rates (e.g., power import and export rates) can affect the health of the battery storage system 14. Therefore, increasing the lifetime (e.g., measured in a number of full capacity charge/discharge cycles) and cost-effectiveness of the battery storage system can be achieved in part by minimizing large DOD events and delaying costly battery replacements.

In FIG. 3C, a high DOD (approximately 80%) of the battery storage system 14 causes the battery storage system to degrade faster (e.g., estimated 30% decrease in storage capacity in <11 years). Further, when the SOC is allowed to approach 0%, the battery storage system 14 runs the risk of being unable to supply power during emergency situations or unplanned power usages until recovering some charge (e.g., waiting some hours for charging from independent power plant 18 or consuming extra power from the power grid 12).

As shown in FIG. 3D, the operation of the battery storage system 14 can be improved by keeping the SOC far from reaching 0% and 100%. By optimizing an EMS policy to operate the battery storage system 14 with a low DOD, the lifetime of the battery storage system 14 can be greatly extended. In FIG. 3B, the EMS policy implemented by the VPP controller 100 regulates usage of the battery storage system 14 to minimize the DOD (approximately 12%). As a result, the battery life is estimated to be extended to +29 years. Furthermore, by operating with a low depth of discharge (i.e., the SOC always far from 0%), the battery storage system 14 readily has capacity to handle emergency and unplanned usage.

To improve performance, such as implementing the above non-limiting examples in FIG. 3A-3D, a VPP controller 100 employs a control method that utilizes a training dataset from each of the connected components of the intelligent grid system 10 to train a ML model that can optimally coordinate the power distribution between the components. The benefits of the VPP controller 100 may be further extended by using a predictive control policy to account for the dynamic behavior of the components of the power ecosystem.

In general, embodiments of the disclosure include a method of operating a VPP system, a non-transitory computer readable medium storing instructions executable by a computer processor of a VPP system, and a VPP controller that train and apply a ML model to predict parameters of an intelligent grid system and efficiently apply an EMS policy to managing power distribution in the intelligent grid system (e.g., limitations/instructions/rules for power exchange between a power grid, a battery storage system, a power plant, and an EV charging station).

Figure 4A:
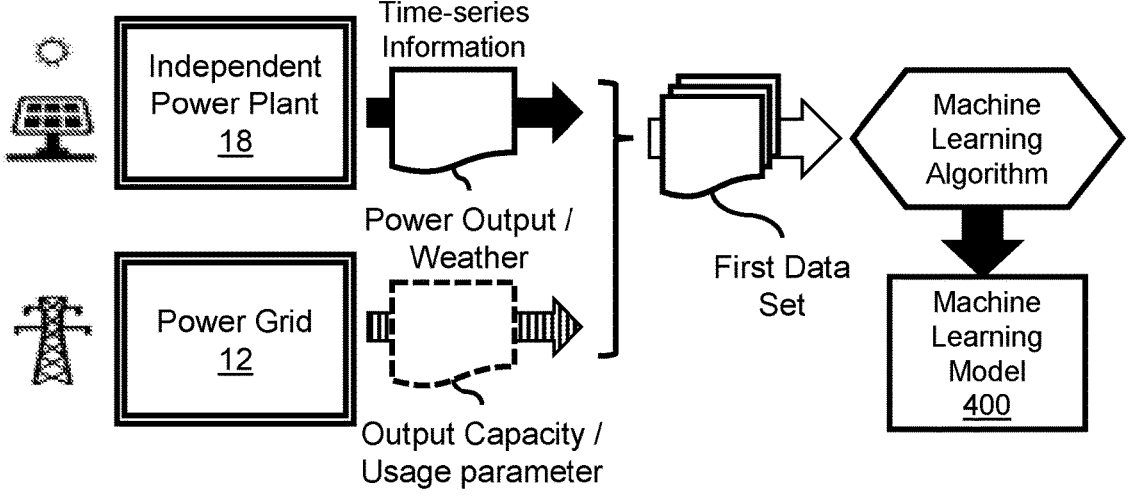
FIGS. 4A-4B show implementation examples of a machine learning (ML) model in accordance with one or more embodiments.
Figure 4B:
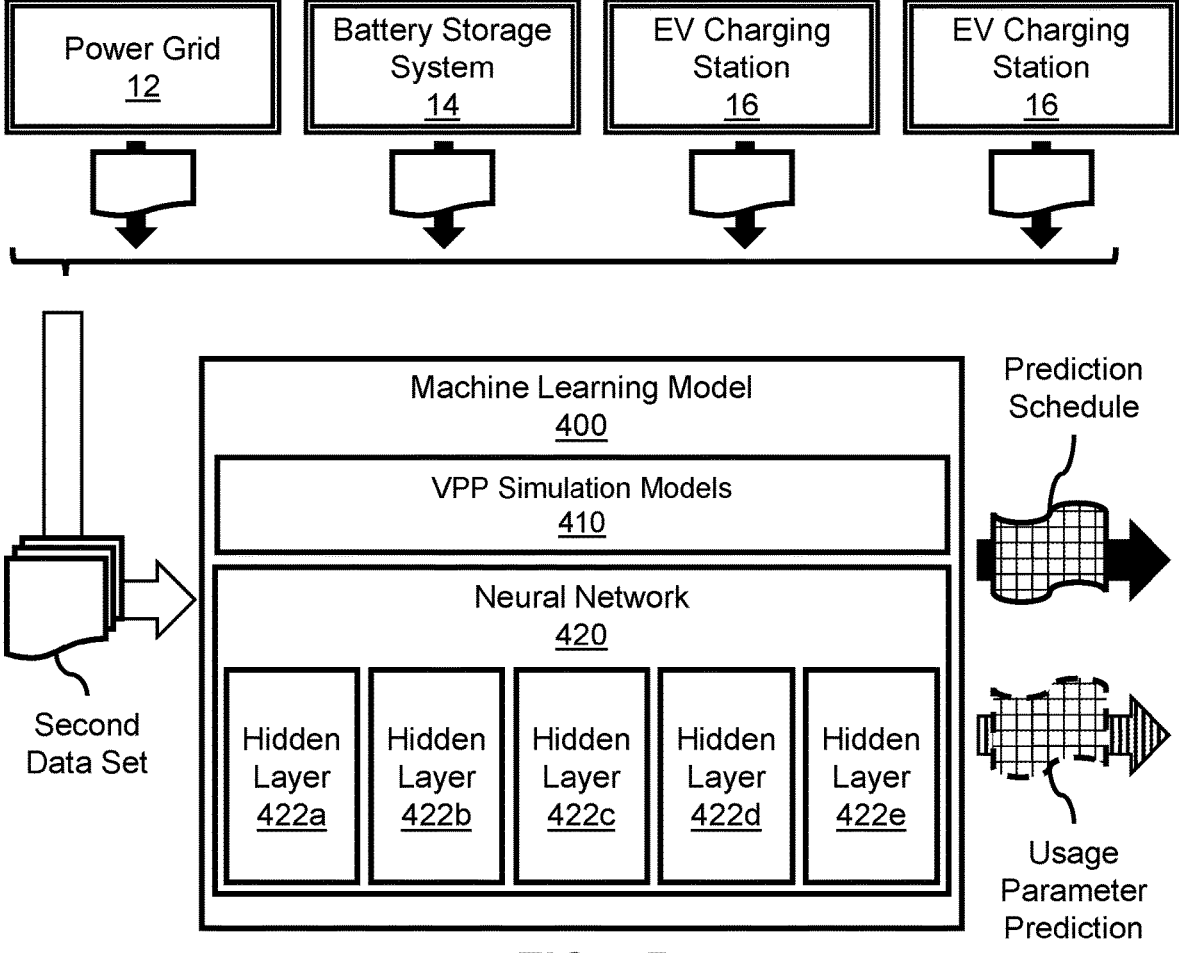

FIGS. 4A-4B show implementation examples of a machine learning (ML) model 400 in accordance with one or more embodiments. Generally, the ML model 400 is trained to predict one or more parameters of the VPP intelligent grid system 10 over a predetermined horizon. By anticipating these parameters of the VPP intelligent grid system 10, an EMS policy may be deployed to efficiently regulate power flow between components of the VPP intelligent grid system 10.

In FIG. 4A, one or more ML algorithms use a first data set including time-series information from the VPP intelligent grid system 10 to train a ML model 400. The time-series information may include historical operational information over a predetermined time period. In one or more embodiments, the first data set includes time-series information from one or more time periods. For example, a first portion of the time-series information may provide short-term data (e.g., between one hour to one week), a second portion of the time-series information may provide medium-term data (e.g., between one week to one year), and a third portion of the time-series information may provide long-term data (e.g., more than one year).

The first data set includes time-series information of power output from the independent power plant 18. The historical operational information from the independent power plant 18 may include power output levels, maintenance schedules, connection type/status (e.g., connected to grid, disconnected from grid, connected with limited capacity, etc.), reliability reports, or any other appropriate information regarding the operation of the individual components. In one or more embodiments equipped with a solar power plant as the independent power plant the first data set may further include weather information used to simulate the solar power plant 18 in the VPP simulation models 410.

In one or more embodiments, the first data set further includes time-series information of the power grid 12. The time-series information may include historical operational information, over one or more time periods, that includes power output capacity and a usage parameter (e.g., amount of power imported, price history, grid stability information) of the power grid 12.

The first data set is supplied to one or more ML algorithms to train the ML model 400 described in further detail below with respect to FIG. 4B. In one or more embodiments, the ML algorithm may include one or more of a Levenberg-Marquardt algorithm, a Gauss-Newton algorithm, a steepest descent algorithm, an artificial neural network, or any combination thereof. However, the scope of the invention should not be limited by the above are non-limiting examples.

As shown in FIG. 4B, the ML model 400 is designed to accept a second data set (e.g., time-series information from components of the VPP intelligent grid system 10) and output a prediction schedule including power output from the independent power plant 18 over a predetermined pre-diction horizon. In one or more embodiments, the ML model 400 may be configured to additionally predict a usage parameter (e.g., amount of power imported, price history, grid stability information) of the power grid 12 over the predetermined prediction horizon.

In one or more embodiments, the ML model 400 may include one or more VPP simulation models 410 (e.g., a digital twin of the physical VPP intelligent grid system 10) that emulates performance over one or more future horizons (e.g., short-term, medium-term, long-term simulations to provide performance metrics that feedback into training). The VPP simulation models 410 may simulate each component of the VPP intelligent grid 10 by utilizing the corresponding interface of the processor 110 (i.e., the power grid interface 112 is configured to simulate the power grid 12, the battery storage interface 114 is configured to simulate the battery storage system 14, the EV interface 116 is configured to simulate the EV charging station 16, and the power plant interface 118 is configured to simulate the independent power plant 18). The processor 110 may validate the ML model by comparing generated data (e.g., augmented, or synthetic data) to a portion of the time-series information in the first data set.

In one or more embodiments, a simulation model of the power grid 12 considers inputs such as power flow command signals (e.g., defined by a user or the energy management policy of the VPP controller 100) and outputs the instantaneous price (e.g., a cost parameter) of the electrical energy ($/kW·hr) and the reference constant power value to be provided by the power grid 12. Other parameters characterizing the power grid simulation model may include the reference value of electric energy from one or more providers, the maximum absolute value of the power capacity, the reference value of the power to be delivered by the power grid, a flag for activating/deactivating the power grid connection to the VPP intelligent grid system 10, and the electric energy price dynamics (e.g., expected price models based on different economic trajectories such as a constant value, a sinusoidal value, and a random value centered on the reference energy cost). In one or more embodiments, the ML model 400 includes a power grid simulation model based on the time-series information of the power grid.

In one or more embodiments, a simulation model of the battery storage system 14 considers inputs such as power flow command signals (e.g., defined by a user or the energy management policy of the VPP controller 100) and outputs the battery state of charge (SOC), a reference SOC (e.g., a threshold level for determining new control behavior), and the instantaneous value of the battery power. Other parameters characterizing the power grid simulation model may include the battery SOC value at the beginning of the simulation, the reference SOC, the battery power converter efficiency, the battery capacity, a switch permitting to activate/deactivate the battery connected to the VPP intelligent grid system 10, and a flag/status for defining the battery thermal dynamics (temperature effects in simulating the performance of the battery 14a and battery cells 14al can be considered or ignored based on the flag).

Furthermore, battery simulation models representing lithium-ion, lithium-polymer, or lead-acid batteries can be parameterized by using manufacturer data to approximate the open-circuit voltage and the internal resistance characteristics related to battery state of charge and temperature. For example, a leakage model may be employed based on the chemical property of the batteries to characterize the amount of self-discharge. Consider the battery open circuit $E_m$ and the internal resistance $R_{int}$, the battery dynamics may be described by Equation (0) (positive current indicates battery discharge):

$$V_T = E_m + I_{batt}R_{int}; \qquad (0)$$

$$I_{batt} = \frac{I_{in}}{N_p};$$

$$V_{out} = N_S V_T;$$

$$SOC = \frac{1}{Cap_{batt}} \int I_{batt} dt;$$

$$Ld_{AmpHr} = \int I_{batt} dt$$

where $I_{batt}$ is the battery current, $Ld_{AmpHr}$ is the battery energy, $Cap_{batt}$ is the battery capacity, $V_{out}$ is the battery voltage, $N_p$ and $N_s$ are the number of cells in parallel and series, respectively, $I_{in}$ is the current flowing from the battery network, and SOC is the battery state of charge. In one or more embodiments, this simulation model may be extended to include thermal dynamic effects and/or aging effects.

In one or more embodiments, the battery storage system 14 would be modelled as a set of cells, single batteries, and/or long strings of high-capacity batteries operating as a power storage unit. This battery model is controlled by the VPP controller 100, which regulates the power flow between cells, charging and discharging phases, and other aspects related to battery management services according to battery specifications and operating conditions. The simulation model may include additional features, such as full power battery equalization capability, battery cell disconnection capability, thermal management, protection, and fault tolerance methods or maximization of the delivered battery energy, heuristic methods (deterministic rule-based strategies), optimization methods (based on robust optimal or predictive control methods).

In one or more embodiments, a simulation model of the EV charging station 16 considers inputs such as power flow command signals (e.g., defined by a user or the energy management policy of the VPP controller 100) and outputs the EV battery state of charge (SOC), a reference EV SOC (e.g., a threshold level for determining new control behavior), and a map of the power to be provided from/to the EV for charging/discharging operations. Other parameters characterizing the power grid simulation model may include the EV battery SOC value at the beginning of the simulation, the reference EV SOC, the EV battery power converter efficiency, the EV battery capacity, a switch permitting to activate/deactivate the connection between the EV and the VPP intelligent grid system 10, and a flag/status for defining the battery thermal dynamics (temperature effects in simulating the performance of the EV battery).

This simulation model may be designed to maximize the EV battery life while minimizing energy cost and charging time for the owner of the EV. The simulation model may be expanded to provide an optional online charge trade application that manages charge offering/reserve/purchase to reflect the capabilities that allow EVs to share their battery with the intelligent grid system. Therefore, the EV may be modeled as an expansion of the overall power capacity of EV charging station 16 (or the VPP intelligent grid system 10 as a whole). The simulation model further predicts the financial benefit to the owner of the EV that participates in such a power-to-grid service and moderates the service to ensure the EV is charged for use by the owner based on the owner's usage or preference information.

In one or more embodiments, a simulation model of the independent power plant 18 (e.g., a solar power plant 18) considers inputs such as power flow command signals (e.g., defined by a user or the energy management policy of the VPP controller 100) and outputs a reference power level value to be provided by the independent power plant 18. Other parameters characterizing the independent power plant simulation model may include the maximum absolute value of the power production capacity, the reference value of the power to be delivered by the independent power plant, a flag for activating/deactivating the independent power plant connection to the VPP intelligent grid system 10, and weather information (or relevant forecasts related to the method of energy production). In one or more embodiments, the ML model 400 includes a solar power simulation model based on the solar power conversion efficiency parameter and the weather information.

In one or more embodiments including a solar power plant 18, this simulation model may mimic the series and parallel connection of several solar panels composed of photovoltaic (PV) devices (solar cells). Because the solar cells convert solar energy into electrical energy via the photovoltaic effect (generally by utilizing large-area p-n diodes that are assembled in modules (panels)), a single solar cell may be modeled as a resistor connected in series with a parallel combination of a current source consisting of a single diode with a shunt resistance structure RSH. The simulation model simulates the photoelectric effect that converts solar energy directly into electric energy and simulates the electrical characteristics (current, voltage, and resistance) that vary based on the amount of light upon the solar cell.

In one or more embodiments, the ML model 400 includes a deep learning neural network 420. The neural network 420 may include one or more hidden layers 422a-e (e.g., convolutional, pooling, filtering, down-sampling, up-sampling, layering, regression, dropout), where each hidden layer includes one or more modelling nodes (i.e., neurons). In some embodiments, the number of hidden layers may be greater than or less than the five layers shown in FIG. 5B. The hidden layers 422a-e can be arranged in any order.

Each hidden layer 422 includes one or more modelling neurons. The neurons are modelling nodes or objects that are interconnected to emulate the connection patterns of the human brain. Each neuron may combine data inputs with a set of network weights and biases for adjusting the data inputs. The network weights may amplify or reduce the value of a particular data input to alter the significance of each of the various data inputs for a task that is being modeled. For example, adding a constant to a particular data input shifts the activation function for an associated task being modeled. The activation function in turn determines whether and to what extent an output of one neuron affects other neurons (e.g., one neuron output may be a weight value for use as an input to another neuron or hidden layer). Through machine learning, the neural network 510 may determine which data inputs should receive greater priority in determining one or more specified outputs of the neural network 510.

For example, in one or more embodiments, one or more semi-supervised, unsupervised (e.g., such one short learning), and/or reinforcement based (e.g., feedback based on simulated performance metrics of the VPP intelligent grid system 10) machine learning algorithms train the hidden layers 422 of the neural network 420 using a first data set.

The first data set may include labeled or unlabeled time-series information from components of the VPP intelligent grid system 10 (e.g., information obtained from each of the power grid 12, the battery storage system 14, the EV charging station 16, and the power plant 18). In one or more embodiments, the first data set may be labelled according to power usage of the EV charging station 16, power output of the independent power plant 18, power output capacity of the power grid 12, and SOC of the battery storage system 14. In one or more embodiments, real, synthetic, and/or augmented (e.g., curated, or supplemented data) data from one or more components of the VPP intelligent grid system 10 may be combined to produce a large amount of interpreted data as the first data set.

The trained ML model 400 accepts a second data set as an input to predict one or more parameters of the VPP intelligent grid system 10 over a predetermined horizon. The second data set may include time-series information of power demand information from the EV charging station 16; and power availability information from each of the battery storage system 14, the power grid 12, and the independent power plant 18.

The time-series information in the second data set may be live (i.e., real-time) and/or recent time-series operational information from each component of the VPP intelligent grid system 10. The operational information may include input/output power levels, connection type/status, equipment status/reliability reports, or any other appropriate information regarding the operation of the individual components of the VPP intelligent grid system 10.

The output of the ML model 400 includes a predicted schedule of power output from the independent power plant 18 over the predetermined prediction horizon. In addition, the ML model 400 may predict a usage parameter of the power grid 12 over the predetermined prediction horizon. In other words, the pre-learned (i.e., trained) filters of the hidden layers 422 convolve the power demand information and the power availability information in the second data set to predict one or more parameters such as the predicted schedule of power output from the independent power plant 18 and/or the usage parameter of the power grid 12. Based on the predicted parameters, an EMS policy may be deployed to efficiently regulate power flow between components of the VPP intelligent grid system 10.

In one or more embodiments, the output of the ML model 400 (e.g., the prediction schedule for the independent power plant 18 and/or the predicted usage parameter for the power grid 12) may have higher time resolution than the first data set. In other words, with sufficient training, the ML model 400 may make high quality predictions based on incomplete or poor quality data (e.g., interrupted data streams, older/low resolution equipment) in the first data set.

While FIGS. 4A-4B show an example configuration, other model configurations may be used without departing from the scope of the disclosure. For example, in the ML model 400, a different type of machine learning compatible model may be used in addition to or instead of the VPP simulation models 410 and the neural network 420 shown in FIG. 4B. Accordingly, the scope of the invention should not be limited by the specific ML model 400 depicted in FIG. 4A-4B.

Figures 5A, 5B:
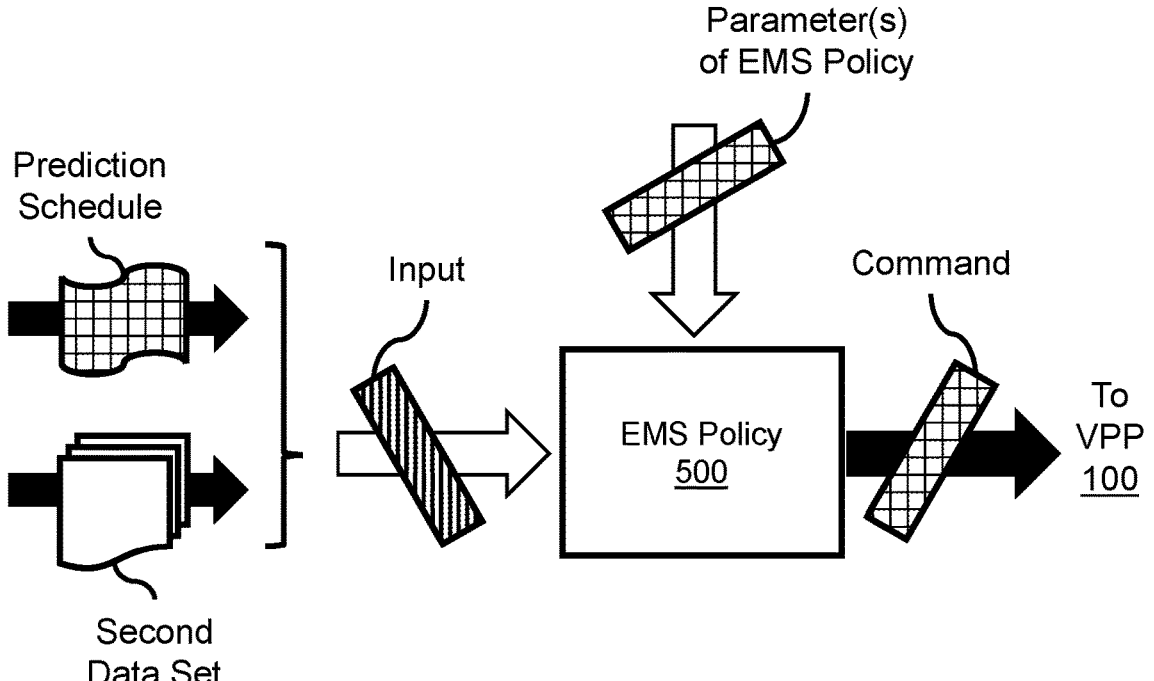
FIGS. 5A-5B show an example framework of an EMS policy in accordance with one or more embodiments.

FIGS. 5A-5B show an example framework of an EMS policy 500 in accordance with one or more embodiments. The EMS policy 500 of FIGS. 5A-5B may be implemented using instructions stored on a non-transitory medium that may be executed by a computer processor (e.g., a VPP controller 100 as discussed above with respect to FIGS. 1A-1B).

In one or more embodiments, the EMS policy 500 comprises a linear parameter-varying (LPV) model. Generally, the LPV model considers the use of a predictive control framework to formulate the EMS control policy according to a receding horizon approach. The definition of an optimization problem requires a mathematical model that reflects and emulates the main dynamics of the VPP intelligent grid system 10.

To achieve the designed objective, the EMS policy 500 may be based same VPP simulation models utilized by the ML model. The suitable paradigm to be considered for developing a simulation model would be a predictive control policy, commonly termed Model Predictive Control (MPC). The main principle of MPC is to transform the control problem into an optimization one and solve this optimization problem over a prediction horizon at each sample time, subject to system dynamics, an objective function (linear or quadratic), and constraints on states, actions, and inputs. At each control step, the optimization obtains a sequence of actions optimizing expected system behavior over the prediction horizon. Only the first step of the sequence of control actions is executed by the controller on the system until the next sample time, after which the procedure is repeated with new process measurements.

The main aspect to consider for developing an effective MPC able to satisfy previous specifications is to correctly map controller requirements into the optimization problem formulation. This would be obtained by defining the interesting dynamics and economics/control performance indices to be minimized by solving the optimization problem. Once the optimization problem is correctly formulated in a closed-form way, it would be cast in a form aided to include the prediction of dynamics of the different components of the VPP intelligent grid system 10. Considering the type of MPC application, the future behavior of different virtual power plant subsystems would be evaluated by appropriate prediction algorithms.

By consolidating models of the individual components of the VPP intelligent grid system 10, a discrete-time state-space LPV approach may be developed as the EMS policy 500 that regulates the power flow within the VPP intelligent grid system 10.

Functionally, the EMS policy 500 accepts a status vector (e.g., a characterization of the state of the system) as an input and outputs a command structure including one or more instructions to allocate power between the different components of the VPP intelligent grid system 10. In one or more embodiments, a status vector includes information from the predicted parameters of the ML model 400 (e.g., the prediction schedule of) and the second data set. For example, the status vector may include: a power utilization of the independent power plant 18 (e.g., a measured value and/or a value based on the predicted schedule of power output from the independent power plant 18); a power utilization of the power grid 12 (e.g., a measured value and/or a value based on the predicted usage parameter of the power grid 12); a state of charge (SOC) of the battery storage system 14; a state of charge of a vehicle connected to the EV charging station 16; and a power utilization of the vehicle connected to the EV charging station 16.

In one or more embodiments, the output command from the EMS policy may include a control vector. For example, the control vector may include: a power command for the independent power plant 18; a power command for the power grid 12; a power command for the battery storage system 14; a power command for the vehicle connected to the EV charging station 16.

Parameters of the EMS policy 500 may be tuned to calibrate the EMS policy 500 to the operational requirements of the VPP intelligent grid system 10. Appropriately defining the parameters of the EMS policy 500 may approach an optimal energy management solution that balances performance with maintaining the condition of the components of the VPP intelligent grid system 10. In one or more embodiments, the parameters of the EMS policy 500 may be derived based on outputs of the ML model 400. For example, in one or more embodiments in which the ML model predicts a cost parameter of the power grid 12, the cost parameter may be incorporated in the balancing of power flow between components of the VPP intelligent grid system 10, as described in further detail below with respect to weight matrices in a non-limiting example of an LPV approach.

The following description is based upon the VPP intelligent grid system 10 shown in FIG. 1A, where the EV charging station 16 includes three charging ports. However, the present invention is not limited to the particular configuration described herein, and the LPV approach may be appropriate expanded, simplified, or adapted to according to the appropriate configuration of the system being controlled.

In the general form, the state of the system is discretely propagated forward in time based on a current status of the system and control elements weighted by time-varying matrices, according to Equations (1)-(5).

$$x_{k+1} = A_k x_k + B_k u_k \qquad (1)$$

$$y_k = C_k x_k \qquad (2)$$

$$u(k) = \begin{bmatrix} P_{IND_{in}}(k) \\ P_{GRD_{in}}(k) \\ P_{BAT_{in}}(k) \\ P_{EV1_{in}}(k) \\ P_{EV2_{in}}(k) \\ P_{EV3_{in}}(k) \end{bmatrix} ; x(k) = \begin{bmatrix} P_{IND_{in}}(k-1) \\ C_{GRD}(k) \\ SOC_{BAT}(k) \\ SOC_{EV1}(k) \\ SOC_{EV2}(k) \\ SOC_{EV3}(k) \\ P_{EV1_{in}}(k) \\ P_{EV2_{in}}(k) \\ P_{EV3_{in}}(k) \\ \Delta Pk \end{bmatrix} ; y(k) = \begin{bmatrix} P_{IND_{in}}(k) \\ C_{GRD}(k) \\ SOC_{BAT}(k) \\ SOC_{EV1}(k) \\ SOC_{EV2}(k) \\ SOC_{EV3}(k) \\ P_{EV1_{in}}(k) \\ P_{EV2_{in}}(k) \\ P_{EV3_{in}}(k) \\ \Delta P(k) \end{bmatrix} \qquad (3)$$

-continued $$A_k = \begin{bmatrix} 0 & 0 & 0 & 0 & 0 & 0 & 0 & 0 & 0 & 0 \\ 0 & 1 & 0 & 0 & 0 & 0 & 0 & 0 & 0 & 0 \\ 0 & 0 & 1 & 0 & 0 & 0 & 0 & 0 & 0 & 0 \\ 0 & 0 & 0 & 1 & 0 & 0 & 0 & 0 & 0 & 0 \\ 0 & 0 & 0 & 0 & 1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \end{bmatrix} ; \qquad (4)$$

$$B_k = \begin{bmatrix} 1 & 0 & 0 & 0 & 0 & 0 \\ 0 & b_1 & 0 & 0 & 0 & 0 \\ 0 & 0 & b_2 & 0 & 0 & 0 \\ 0 & 0 & 0 & b_3 & 0 & 0 \\ 0 & 0 & 0 & 0 & b_4 & 0 \\ 0 & 0 & 0 & 0 & 0 & b_5 \\ 0 & 0 & 1 & 0 & 0 & 0 \\ 0 & 0 & 0 & 1 & 0 & 0 \\ 0 & 0 & 0 & 0 & 1 & 0 \\ 1 & 1 & -1 & -1 & -1 & -1 \end{bmatrix} ; C_k = I_{10 \times 10}$$

$$b_1 = T_s \times \frac{C_h}{60 \times 60} ; b_2 = \frac{T_s \eta_{BAT}}{60 \times 60} \times \frac{1}{C_{BAT}} ; \qquad (5)$$

$$b_3 = b_4 = b_5 = \frac{T_s \eta_{EV}}{60 \times \Delta T} \times \frac{1}{P_{EV_{ref}}}$$

The parameters populating Equations (1)-(5), and the following Equations, are defined as follows in TABLE 1.

TABLE 1

| $P_{IND}$ | Available power from independent power plant [W] | $P_{BAT}$ | Battery power command (positive = VPP to battery) [W] |
|---|---|---|---|
| $P_S$ | Available power from solar power plant $[W] = \dfrac{(r_m \times P_{SN} \times \eta_S)}{100 \times 100}$ | $SOC_{BAT}$ | Battery state of charge [%] |
| $r_m$ | Measured relative solar radiation [%] | $C_{BAT}$ | Battery capacity [Wh] |
| $\eta_S$ | Solar power conversion efficiency [%] | $\eta_{BAT}$ | Battery conversion efficiency [%] |
| $P_{SN}$ | Nominal power from solar power plant [W] | $\Delta SOC_{BAT}(k)$ | SOC increment $[\%] = P_{BAT} \times \dfrac{\eta_{BAT}}{C_{BAT}} \times \dfrac{T_S}{60 \times 60}$ |
| $T_S$ | Sampling time [s] | $SOC_{BAT}(k+1)$ | Predicted battery SOC [%] = $SOC_{BAT}(k) + \Delta SOC_{BAT}(k)$ |

TABLE 1-continued

| $P_{GRID_{in}}$ | Power grid command (positive = grid to VPP) [W] | $P_{EV\#_{in}}$ | EV power command (positive = VPP to EV) [W] |
|---|---|---|---|
| $C_h$ | Energy cost [\$/Wh] | $SOC_{EV\#}$ | EV state of charge [%] |
| $C_{GRD}$ | Power cost [\$] | $P_{EV_{ref}}$ | EV reference power [Wh] |
| $P_{GRD_{max}}$ | Maximum AC power [W] | $\eta_{EV}$ | EV conversion efficiency [%] |
| $\Delta C_{GRD}(k)$ | Power cost increment $[\$] = \dfrac{(T_S \times C_h \times P_{GRID_{in}})}{60 \times 60}$ | $\Delta T$ | Charge time interval [min] ($\in$ [45,480] for fast/slow charge) |
| $C_{GRD}(k+1)$ | Predicted power cost [\$] = $C_{GRD}(k) + \Delta C_{GRD}(k)$ | $\Delta SOC_{EV}(k)$ | SOC increment $[\%] = \dfrac{P_{EV\#_{in}}}{P_{EV_{ref}}} \times T_S \times \dfrac{\eta_{EV}}{60 \times \Delta T}$ |
| | | $SOC_{EV}(k+1)$ | Predicted EV SOC [%] = $SOC_{EV}(k) + \Delta SOC_{EV}(k)$ |

The state-space model of the system is defined according to the previously-referenced simulation models of the components of the VPP intelligent grid system 10. $A_k$, $B_k$, and $C_k$ are time-varying matrices that weight the influence the effect of the state of the system $x_k$, the control input matrix $u_k$ that allocates power between the different components of the VPP intelligent grid system 10, and the set of measured and/or controlled output $y_k$, respectively. Note that the bottom row of weight matrix $B_k$ guarantees that the full available power provided within the VPP intelligent grid system 10 is allocated.

The constraints that reflect the logical and realistic limits (e.g., power input/output limits, relative charge capacity levels) of the physical systems incorporated in the VPP intelligent grid system 10 are represented by Equation (6).

$$
\begin{aligned}
0 &\leq P_{IND_{in}}(k) \leq P_{IND} & 0 &\leq P_{IND_{in}}(k) \leq P_{IND} \\
-P_{GRD_{max}} &\leq P_{GRD_{in}}(k) \leq P_{GRD_{max}} & -inf &\leq C_{GRD}(k) \leq inf \\
-P_{BAT_{max}} &\leq P_{BAT_{in}}(k) \leq P_{BAT_{max}} & 0 &\leq SOC_{BAT}(k) \leq 100 \\
-P_{EV1_{max}} &\leq P_{EV1_{in}}(k) \leq P_{EV1_{max}} & 0 &\leq SOC_{EV1}(k) \leq 100 \\
-P_{EV2_{max}} &\leq P_{EV2_{in}}(k) \leq P_{EV2_{max}} & 0 &\leq SOC_{EV2}(k) \leq 100 \\
-P_{EV3_{max}} &\leq P_{EV3_{in}}(k) \leq p_{EV3_{max}} & 0 &\leq SOC_{EV3}(k) \leq 100
\end{aligned}
\tag{6}
$$

The basic form of a reference control vector $r_k$ that is output by the EMS policy 400 is represented by Equation (7).

$$
r_k = \begin{bmatrix}
P_{IND} \\
0 \\
SOC_{BAT_{ref}} \\
SOC_{EV1_{ref}} \\
SOC_{EV2_{ref}} \\
SOC_{EV3_{ref}} \\
P_{EV1_{ref}} \\
P_{EV2_{ref}} \\
P_{EV3_{ref}} \\
0
\end{bmatrix}
\tag{7}
$$

The previous state-space model can be used to formulate the optimization problem in a predictive form by defining the prediction matrices represented by Equations (8)-(10). Specifically, Equation (8) represents the state-space model formulated with respect to input rate variation $\Delta u(k)$, Equation (9) represents matrices describing the prediction over certain control horizon $N_u$ and prediction horizon $N_p$, and Equation (10) represents the compact equation estimating the future output by a given measured state $\bar{x}(k)$ and a sequence of control inputs $U(k)$.

$$
\bar{A}(k) = \begin{bmatrix} A_k & B_k \\ 0 & I \end{bmatrix};
\tag{8}
$$

$$
\bar{B}(k) = \begin{bmatrix} B_k \\ 0 \end{bmatrix};
$$

$$
\bar{C}(k) = [\, C_k \quad 0 \,];
$$

$$
\bar{x}(k) = \begin{bmatrix} x_k \\ u_{k-1} \end{bmatrix}
$$

$$
F(k) = \begin{bmatrix} \bar{C}(k)\bar{A}(k) \\ \vdots \\ \bar{C}(k)\bar{A}(k)^{N_p} \end{bmatrix};
\tag{9}
$$

$$
D(k) = \begin{bmatrix} \bar{C}(k)\bar{B}(k) & \cdots & 0 \\ \vdots & \ddots & \vdots \\ \bar{C}(k)\bar{A}(k)^{N_p-1}\bar{B}(k) & \cdots & \bar{C}(k)\bar{A}(k)^{N_p-N_u}\bar{B}(k) \end{bmatrix};
$$

$$
U(k) = \begin{bmatrix} \Delta u(k) \\ \vdots \\ \Delta u(k+N_u) \end{bmatrix}
$$

$$
Y = F(k)\bar{x}(k) + D(k)U(k)
\tag{10}
$$

For the above, the EMS optimization problem within a predictive framework can be formulated according to Equation (11)-(20) below.

$$
\min_u \sum_{i=1}^{N_p-1} \|Q(y(k+i \,|\, k) - r(k))\|_2^2 + \sum_{j=1}^{N_u} \|R(\Delta u(k+j \,|\, k))\|_2^2
\tag{11}
$$

$$
\text{s.t. } x(k+i+1 \,|\, k) = A_k x(k+i \,|\, k) + B_k u(k+i)
\tag{12}
$$

$$
y(k+i \,|\, k) = C_k x(k+i \,|\, k)
\tag{13}
$$

$$
x(k \,|\, k) = \hat{x}(k)
\tag{14}
$$

$$
u(k+i+1) = u(k+i)
\tag{15}
$$

$$
\text{for } i > N_u
$$

$$
u(k+i+1) = u(k+i) + \Delta u(k+i+1)
\tag{16}
$$

$$
\text{for } i \leq N_u
$$

$$
\Delta u(k+i) \in D
\tag{17}
$$

-continued $$u(k+i) \in U \qquad (18)$$

$$y(k+i) \in Y \qquad (19)$$

$$N_p \geq N_u \qquad (20)$$

The parameters Q, R, and P are weight matrices on controlled output and control, respectively. Equations (12)-(13) represent the nominal state-space model and Equations (16)-(18) represent convex constraints sets on control input magnitude and rate and controlled output magnitude, respectively.

From here, the optimization problem can be formulated in a compact form and computationally solvable form. Equation (21) is equivalent to the cost function of Equation (11). Equation (22) represents constraints on input and output signals.

$$\min_z \frac{1}{2} z' H_k z + \rho_k' F_k' z \qquad (21)$$

$$\text{s.t. } G_k z \leq b_k; \qquad (22)$$

$$z = [\, U(k) \quad s(k)\,];$$

$$\rho_k = \begin{bmatrix} u(k-1) \\ x(k) \\ r(k) \end{bmatrix}$$

The problem matrix is then formulated as Equation (23), as supported by the definitions in Equations (24)-(28).

$$H_k = \begin{bmatrix} D(k)' \bar{Q} D(k) + \bar{R} & 0 \\ 0 & s_w \end{bmatrix}; \qquad (23)$$

$$F_k = [\, D(k)' \quad \bar{Q} F(k) \quad 0\,];$$

$$G_k = \begin{bmatrix} G_1 & 1 \\ G_2 & 1 \\ G_3 & 1 \end{bmatrix};$$

$$b_k = \begin{bmatrix} b_1 \\ b_2 \\ b_3 \end{bmatrix}$$

$$G_1 = \begin{bmatrix} -C_2 \\ C_2 \end{bmatrix}; \qquad (24)$$

$$b_1 = \begin{bmatrix} -U_{min} + C_1 u(k-1) \\ U_{max} + C_1 u(k-1) \end{bmatrix}$$

$$G_2 = \begin{bmatrix} -I \\ I \end{bmatrix}; \qquad (25)$$

$$b_2 = \begin{bmatrix} -\Delta U_{min} \\ \Delta U_{max} \end{bmatrix}$$

$$G_3 = \begin{bmatrix} -D \\ D \end{bmatrix}; \qquad (26)$$

$$b_3 = \begin{bmatrix} -Y_{min} + F(\bar{x}(k) + \bar{d}(k)) \\ Y_{max} + F(\bar{x}(k) + \bar{d}(k)) \end{bmatrix}$$

$$C_1 = \begin{bmatrix} I \\ \vdots \\ I \end{bmatrix}; \qquad (27)$$

$$C_2 = \begin{bmatrix} I & 0 & 0 \\ \vdots & \ddots & 0 \\ I & \cdots & I \end{bmatrix}$$

$$\bar{Q} = \text{diag}(Q, \ldots, P); \qquad (28)$$

$$\bar{R} = \text{diag}(R, \ldots, R);$$

-continued $$s_w \gg \max(|R|, |Q|, |P|)$$

The variable s(k) is a slack variable that relaxes constraints if the problem results are infeasible. The parameter $s_w$ is a weight variable defined according to the constraints imposed by the other weight matrices Q, P, and R.

FIG. 5B shows examples of parameters of the EMS policy 500 that may be tuned to calibrate the EMS policy 500 to the operational requirements of the VPP intelligent grid system 10.

The weight matrix Q may bias measurements of the battery storage system, the power grid, the independent power plant, and the EV charging station in the LPV model. The weight matrix R may bias control rates in the LPV model. Modify the control horizon, prediction horizon, and/or time step parameters (e.g., independently, or together) adapts the EMS policy 500 to the relevant timescale of VPP intelligent grid system 10. For example, when components of the VPP intelligent grid system 10 are more dynamic (e.g., changing weather patters affecting a solar power plant 18 during certain seasons, increased demand, or traffic at EV charging station 16 during certain periods of the day or year), the parameters may be reconfigured for a more responsive EMS policy 500.

Appropriately defining the parameters of the EMS policy 500 may approach an optimal energy management solution that balances performance with maintaining the condition of the components of the VPP intelligent grid system 10. The parameters of the EMS policy 500 may be selected to minimize an amount of power provided from the power grid 12 (e.g., improve energy independence, reduce strain on the power grid 12). In one or more embodiments, the parameters of the EMS policy 500 may be selected to optimize the usage of battery storage system 16 (e.g., minimizing the intensity and/or duration of charging/discharging events on the battery storage system 14).

Furthermore, the parameters of the EMS policy 500 may be iteratively reevaluated based on the usage and current conditions in the VPP intelligent grid system 10. In other words, the parameters of the EMS policy 500 may be constantly reevaluated and retuned to adapt to operational conditions of the VPP intelligent grid system 10 over different timescales (e.g., daily, weekly, monthly seasonal, yearly, lifetime calibrations).

While FIGS. 5A-5B and the corresponding description of the LPV model include specific parameters and values, one of ordinary skill in the art will appreciate that other configurations of the LPV may be considered without departing from the gist of the invention. For example, the control vector format, measurement format, weight matrices, and slack variable, may be reformulated according to the configuration of any given VPP intelligent grid system 10. Furthermore, the EMS policy 500 may include more, fewer, or different parameters (e.g., pricing parameter of power from the power grid 12, equipment health monitoring parameters, power supplier preferences within the VPP intelligent grid system 10) that effect the optimization problem represented by Equations (21) and (22). Accordingly, the LVP model may be expanded, simplified, or adapted to according to the appropriate configuration of the system being controlled. Accordingly, the scope of the invention should not be limited by the specific description above and depiction in FIGS. 5A-5B.

FIG. 6 shows a flowchart in accordance with one or more embodiments. One or more of the individual processes in FIG. 6 may be performed by the VPP controller 100 of FIGS. 1A-1B, as described above. One or more of the individual processes shown in FIG. 6 may be omitted, repeated, and/or performed in a different order than the order shown in FIG. 6. Accordingly, the scope of the invention should not be limited by the specific arrangement as depicted in FIG. 6.

At 610, the processor 110 of the VPP controller 100 obtain a first data set including time-series information of power output from the independent power plant 18. The first data set may be retrieved from each component of the VPP intelligent grid 10 by its corresponding interface of the processor 110 (i.e., the power grid interface 112 communicates with the power grid 12, and the power plant interface 118 communicates with the independent power plant 18).

At 620, the processor 110 trains a ML model 400 using the first data set and a machine learning (ML) algorithm. In one or more embodiments, the ML model 400 may be configured to predict power output from the independent power plant 18 over a predetermined prediction horizon. In one or more embodiments, the ML model 400 may be configured to predict the usage parameter of the power grid 12 over the predetermined prediction horizon.

At 630, the processor 110 obtains a second data set including power condition information from components of the VPP intelligent grid system. The second data set may include time-series information of: power demand information from the EV charging station; and power availability information from each of the battery storage system, the power grid, and the independent power plant. Similar to the above, the information may be retrieved from each component of the VPP intelligent grid system 10 by the corresponding interface of the processor 110.

At 640, the processor 110 generates a predicted schedule by inputting the second data set into the ML model. Based on the second data set, the ML model may generate a predicted schedule of power output from the independent power plant over the predetermined prediction horizon. In addition, the ML model 400 may predict a usage parameter of the power grid 12 over the predetermined prediction horizon. In one or more embodiments, the output of the ML model 400 (e.g., the prediction schedule for the independent power plant 18 and/or the predicted usage parameter for the power grid 12) may have higher time resolution than the first data set.

At 650, the processor 110 generates a command by inputting the second data set and the predicted schedule into an EMS policy (e.g., the EMS policy of FIGS. 5A-5B). The command may include instructions for controlling: power imported from at least one of the power grid, the battery storage system, the EV charging station, and the independent power plant; and power exported to at least one of the power grid, the battery storage system, and the EV charging station. The command may be a vector including multiple instructions.

At 660, the processor 110 transmits a command to adjust an operation of at least one of the power grid, the battery storage system, the EV charging station, and the independent power plant. In one or more embodiments, the command includes one or more instructions to control an amount of power exported from at least one of the power grid, the battery storage system, the independent power plant, and the EV charging station. In one or more embodiments, a command transmitted by the VPP controller 100 may include multiple commands (e.g., instructions, queries) that are sent to more than one component of the VPP intelligent grid system 10. In other words, the processor 110 of the VPP controller 100 may be configured to transmit a series of individual instructions as sequential commands (e.g., separate transmissions) or compile the individual instructions into a single command transmission (e.g., a single transmission that is broadcast to all components of the VPP intelligent grid system 10). In other words, each command issued by the VPP controller 100 may adjust an operation of at least one of the power grid 12, the battery storage system 14, the EV charging station 16, and the independent power plant 18.

While the various configurations of the command are described herein, one of ordinary skill in the art will appreciate that other embodiments of command/control of a networked system such as a VPP intelligent grid system 10 are possible. For example, instructions may be executed in different orders (e.g., in parallel or reordered), repeated, combined, and/or omitted based on efficiency considerations or the particular architecture of the VPP intelligent grid system 10. Accordingly, the present invention is not limited to the particular configurations described herein.

At 670, the VPP intelligent grid system 10 regulates power flow between components of the VPP intelligent grid system 10 based on the EMS policy. Note, the bi-directional power flow for each of the power grid 12, the battery storage system 14, and/or the EV charging station 16 may be controlled by the command from the VPP controller 100 to balance power across the VPP intelligent grid system 10. In addition, the unidirectional power flow out of the independent power plant 18 may be regulated by the command from the VPP controller 100.

For example, the command may include one or more of the following: an instruction to the power grid 12 to change a reference power level (e.g., an output capacity threshold, a minimum/maximum output capacity); an instruction to the battery storage system 14 to change the state of charge by charging or discharging the battery 14a (e.g., to export power to power grid 12 or EV charging station 16); an instruction to the regulate power usage by the EV charging station 16 or export power from the EV charging station 16 (e.g., discharge an EV during to support the power grid 12 during peak power consumption periods); an instruction to provide an amount of power from one component of the VPP intelligent grid system 10 to another component of the VPP intelligent grid system 10. These examples are for explanatory purposes only and not intended to limit the scope of the disclosed technology.

Embodiments of the invention may have one or more of the following improvements to intelligent grid functionality or power management systems: improve management control policy of components of an intelligent grid system; regulate influence of external factors (electricity cost from power grid, weather influenced power generation) on control policy of an intelligent grid system equipped with multiple potential power sources; control virtual power plant components (control the power flow with the AC grid, manage battery storage system power flow, manage the power dispatch scheme between virtual power plant components, evaluate battery stored energy, capacity fade (battery wearing), estimated time to service (replace batteries), adapt to customers and components power requirements); provide control system to adapt and optimize power flow allocation, optimizing battery charging sequences, providing emergency energy capacity, managing energy excess, implementing physical/logical limits on the power grid operations as defined by the operator; or any combination of these aspects.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of operating a virtual power plant (VPP) controller that manages an electric vehicle (EV) charging station connected to a power grid, a battery storage system, and an independent power plant, the method comprising:

obtaining a first data set including time-series information of power output from the independent power plant;

training, using the first data set and a machine learning (ML) algorithm, a ML model that predicts power output from the independent power plant over a predetermined prediction horizon;

obtaining a second data set including time-series information of:

power demand information from the EV charging station; and power availability information from each of the battery storage system, the power grid, and the independent power plant;

generating, by inputting the second data set into the ML model, a predicted schedule of power output from the independent power plant over the predetermined prediction horizon;

generating, by inputting the second data set and the predicted schedule into an energy management system (EMS) policy, a command that controls:

power imported from at least one of the power grid, the battery storage system, the EV charging station, and the independent power plant; and power exported to at least one of the power grid, the battery storage system, and the EV charging station; and transmitting the command to adjust an operation of at least one of the power grid, the battery storage system, the EV charging station, and the independent power plant.

2. The method of claim 1, wherein the independent power plant is a solar power plant that operates based on a solar power conversion efficiency parameter, and the time-series information of the first data set includes at least six months of data for the power output from the solar power plant.

3. The method of claim 2, wherein the first data set used to train the ML model further includes weather information, and the ML model includes a solar power simulation model based on the solar power conversion efficiency parameter and the weather information.

4. The method of claim 2, wherein the first data set further includes time-series information of the power grid that includes power output capacity and a usage parameter, the ML model includes a power grid simulation model based on the time-series information of the power grid, and the ML model is trained to predict the usage parameter of the power grid over the predetermined prediction horizon.

5. The method of claim 1, wherein in the first data set, a first portion of the time-series information includes data for a first time period, a second portion of the time-series information includes data for a second time period that is longer than the first time period, and the predetermined prediction horizon of the ML model corresponds to a timescale of the first time period.

6. The method of claim 1, wherein the predicted schedule of power output from the independent power plant has higher time resolution than the first data set.

7. A non-transitory computer readable medium storing instructions executable by a computer processor of a virtual power plant (VPP) controller that manages an electric vehicle (EV) charging station connected to a power grid, a battery storage system, and an independent power plant, the instructions comprising functionality for:

obtaining a first data set including time-series information of power output from the independent power plant;

training, using the first data set and a machine learning (ML) algorithm, a ML model that predicts power output from the independent power plant over a predetermined prediction horizon;

a second data set including time-series information of:

power demand information from the EV charging station; and power availability information from each of the battery storage system, the power grid, and the independent power plant;

generating, by inputting the second data set into the ML model, a predicted schedule of power output from the independent power plant over the predetermined prediction horizon;

generating, by inputting the second data set and the predicted schedule into an energy management system (EMS) policy, a command that controls:

power imported from at least one of the power grid, the battery storage system, the EV charging station, and the independent power plant; and power exported to at least one of the power grid, the battery storage system, and the EV charging station; and transmitting the command to adjust an operation of at least one of the power grid, the battery storage system, the EV charging station, and the independent power plant.

8. The non-transitory computer readable medium of claim 7, wherein the independent power plant is a solar power plant that operates based on a solar power conversion efficiency parameter, and the time-series information of the first data set includes at least six months of data for the power output from the solar power plant.

9. The non-transitory computer readable medium of claim 8, wherein the first data set used to train the ML model further includes weather information, and the ML model includes a solar power simulation model based on the solar power conversion efficiency parameter and the weather information.

10. The non-transitory computer readable medium of claim 8, wherein the first data set further includes time-series information of the power grid that includes power output capacity and a usage parameter, the ML model includes a power grid simulation model based on the time-series information of the power grid, and the ML model is trained to predict the usage parameter of the power grid over the predetermined prediction horizon.

11. The non-transitory computer readable medium of claim 7, wherein in the first data set, a first portion of the time-series information includes data for a first time period, a second portion of the time-series information includes data for a second time period that is longer than the first time period, and the predetermined prediction horizon of the ML model corresponds to a timescale of the first time period.

12. The non-transitory computer readable medium of claim 7, wherein the predicted schedule of power output from the independent power plant has higher time resolution than the first data set.

13. A virtual power plant (VPP) controller that manages an electric vehicle (EV) charging station connected to a power grid, a battery storage system, and an independent power plant, the VPP controller comprising:

a processor configured as:

a power grid interface that communicates with the power grid;

a battery storage interface that communicates with the battery storage system;

an EV interface that communicates with the EV charging station; and a power plant interface that communicates with the independent power plant; and a memory storing instructions that, when executed, cause the processor to:

obtain a first data set including time-series information of power output from the independent power plant;

train, using the first data set and a machine learning (ML) algorithm, a ML model that predicts power output from the independent power plant over a predetermined prediction horizon;

obtain a second data set including time-series information of:

power demand information from the EV charging station; and power availability information from each of the battery storage system, the power grid, and the independent power plant;

generate, by inputting the second data set into the ML model, a predicted schedule of power output from the independent power plant over the predetermined prediction horizon;

generate, by inputting the second data set and the predicted schedule into an energy management system (EMS) policy, a command that controls:

power imported from at least one of the power grid, the battery storage system, the EV charging station, and the independent power plant; and power exported to at least one of the power grid, the battery storage system, and the EV charging station; and transmit the command to adjust an operation of at least one of the power grid, the battery storage system, the EV charging station, and the independent power plant.

14. The VPP controller of claim 13, wherein the independent power plant is a solar power plant that operates based on a solar power conversion efficiency parameter, and the time-series information of the first data set includes at least six months of data for the power output from the solar power plant.

15. The VPP controller of claim 14, wherein the first data set used to train the ML model further includes weather information, and the ML model includes a solar power simulation model based on the solar power conversion efficiency parameter and the weather information.

16. The VPP controller of claim 14, wherein the first data set further includes time-series information of the power grid that includes power output capacity and a usage parameter, the ML model includes a power grid simulation model based on the time-series information of the power grid, and the ML model is trained to predict the usage parameter of the power grid over the predetermined prediction horizon.

17. The VPP controller of claim 13, wherein in the first data set, a first portion of the time-series information includes data for a first time period, a second portion of the time-series information includes data for a second time period that is longer than the first time period, and the predetermined prediction horizon of the ML model corresponds to a timescale of the first time period.

18. The VPP controller of claim 13, wherein the predicted schedule of power output from the independent power plant has higher time resolution than the first data set.

\* \* \* \* \*